US011756429B2

(12) United States Patent
Bartel

(10) Patent No.: US 11,756,429 B2
(45) Date of Patent: Sep. 12, 2023

(54) TRANSPORT VEHICLE CONFIGURATION FOR IMPAIRED RIDERS

(71) Applicant: Uber Technologies, Inc., San Francisco, CA (US)

(72) Inventor: Emily Bartel, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 17/664,517

(22) Filed: May 23, 2022

(65) Prior Publication Data

US 2022/0358843 A1 Nov. 10, 2022

Related U.S. Application Data

(63) Continuation of application No. 16/932,127, filed on Jul. 17, 2020, now Pat. No. 11,348,466, which is a continuation of application No. 16/260,663, filed on Jan. 29, 2019, now Pat. No. 10,720,059, which is a
(Continued)

(51) Int. Cl.
| | | |
|---|---|---|
| *B60K 28/06* | (2006.01) | |
| *G08G 1/00* | (2006.01) | |
| *B60W 50/00* | (2006.01) | |
| *G06Q 10/02* | (2012.01) | |

(Continued)

(52) U.S. Cl.
CPC ............ *G08G 1/202* (2013.01); *B60K 28/06* (2013.01); *B60W 50/0098* (2013.01); *G06Q 10/00* (2013.01); *G06Q 10/02* (2013.01); *G06Q 10/0631* (2013.01); *B60W 2050/0075* (2013.01); *B60W 2540/00* (2013.01); *B60W 2556/45* (2020.02)

(58) Field of Classification Search
None
See application file for complete search history.

(56) References Cited

U.S. PATENT DOCUMENTS

| | | |
|---|---|---|
| 6,424,410 B1 | 7/2002 | Pelosi |
| 8,996,224 B1 | 3/2015 | Herbach et al. |
| 9,171,268 B1 | 10/2015 | Penilla et al. |

(Continued)

FOREIGN PATENT DOCUMENTS

| | | |
|---|---|---|
| CN | 103150698 A | 6/2013 |
| CN | 103213534 A | 7/2013 |
| WO | WO-2015099679 A1 | 7/2015 |

OTHER PUBLICATIONS

"U.S. Appl. No. 15/139,612, Examiner Interview Summary dated May 23, 2018", 3 pgs.
(Continued)

*Primary Examiner* — James M McPherson
(74) *Attorney, Agent, or Firm* — SCHWEGMAN LUNDBERG & WOESSNER, P.A.

(57) ABSTRACT

A system for an autonomous vehicle can receive profile data of a passenger of the autonomous vehicle, the profile data indicating a need of the passenger for audio assistance. Based on the profile data, the system can execute a set of configurations to assist the passenger over a trip duration between a pick-up location and a destination. Execution of the set of configurations can include dynamically monitoring the passenger to determine a state of the passenger, and based on the state of the passenger, output the audio assistance to at least aid the passenger in entering and exiting the autonomous vehicle.

19 Claims, 9 Drawing Sheets

Related U.S. Application Data continuation of application No. 15/139,612, filed on Apr. 27, 2016, now Pat. No. 10,255,816.

(51) Int. Cl.
*G06Q 10/0631* (2023.01)
*G06Q 10/00* (2023.01)

(56) References Cited

U.S. PATENT DOCUMENTS

| | | | |
|---|---|---|---|
| 9,335,764 | B2 | 5/2016 | Herz et al. |
| 9,411,780 | B1 | 8/2016 | Awad et al. |
| 9,440,605 | B2 | 9/2016 | Vadgama et al. |
| 9,581,997 | B1 | 2/2017 | Penilla et al. |
| 9,716,565 | B2 | 7/2017 | Mandeville-Clarke et al. |
| 9,789,880 | B2 | 10/2017 | Sweeney et al. |
| 9,902,403 | B2 | 2/2018 | Donnelly et al. |
| 10,255,816 | B2 | 4/2019 | Bartel |
| 10,334,050 | B2 | 6/2019 | Kentley-klay et al. |
| 10,720,059 | B2 | 7/2020 | Bartel |
| 2005/0040573 | A1 | 2/2005 | Bolt et al. |
| 2006/0045030 | A1 | 3/2006 | Bieselin |
| 2007/0219720 | A1 | 9/2007 | Trepagnier et al. |
| 2011/0099040 | A1 | 4/2011 | Felt et al. |
| 2012/0131455 | A1 | 5/2012 | Han et al. |
| 2013/0197674 | A1 | 8/2013 | Lowry |
| 2014/0218307 | A1 | 8/2014 | Goldman-Shenhar et al. |
| 2014/0253722 | A1 | 9/2014 | Smyth |
| 2015/0084985 | A1 | 3/2015 | Baudu |
| 2015/0097864 | A1 | 4/2015 | Alaniz et al. |
| 2015/0109131 | A1 | 4/2015 | Lindberg et al. |
| 2015/0185034 | A1 | 7/2015 | Abhyanker |
| 2015/0338852 | A1 | 11/2015 | Ramanujam |
| 2015/0339928 | A1 | 11/2015 | Ramanujam |
| 2015/0346722 | A1 | 12/2015 | Herz |
| 2016/0001720 | A1 | 1/2016 | Vadgama et al. |
| 2016/0318442 | A1 | 11/2016 | James |
| 2016/0330578 | A1 | 11/2016 | Moussavian et al. |
| 2016/0347348 | A1 | 12/2016 | Lubischer et al. |
| 2016/0358453 | A1 | 12/2016 | Wassef et al. |
| 2017/0103571 | A1 | 4/2017 | Beaurepaire |
| 2017/0113702 | A1 | 4/2017 | Thieberger-Navon et al. |
| 2017/0124671 | A1* | 5/2017 | Tam ............... G06Q 50/14 |
| 2017/0126810 | A1 | 5/2017 | Kentley et al. |
| 2017/0132334 | A1 | 5/2017 | Levinson et al. |
| 2017/0132769 | A1 | 5/2017 | Barron et al. |
| 2017/0136842 | A1 | 5/2017 | Anderson et al. |
| 2017/0151918 | A1 | 6/2017 | Boesen |
| 2017/0153319 | A1 | 6/2017 | Villeneuve et al. |
| 2017/0153636 | A1 | 6/2017 | Boesen |
| 2017/0158023 | A1 | 6/2017 | Stevanovic et al. |
| 2017/0169366 | A1 | 6/2017 | Klein et al. |
| 2017/0253252 | A1 | 9/2017 | Donnelly et al. |
| 2017/0253254 | A1 | 9/2017 | Sweeney et al. |
| 2017/0254886 | A1 | 9/2017 | Kyrtsos et al. |
| 2017/0256229 | A1 | 9/2017 | Kocharlakota et al. |
| 2017/0276494 | A1 | 9/2017 | Kusano et al. |
| 2017/0277191 | A1 | 9/2017 | Fairfield et al. |
| 2017/0291538 | A1 | 10/2017 | Sivak et al. |
| 2017/0294130 | A1 | 10/2017 | Donnelly |
| 2017/0313326 | A1 | 11/2017 | Sweeney et al. |
| 2017/0316696 | A1 | 11/2017 | Bartel |
| 2018/0040162 | A1 | 2/2018 | Donnelly et al. |
| 2018/0040163 | A1 | 2/2018 | Donnelly et al. |
| 2018/0086344 | A1 | 3/2018 | Zhu et al. |
| 2018/0089901 | A1 | 3/2018 | Rober et al. |
| 2019/0156679 | A1 | 5/2019 | Bartel |
| 2020/0349848 | A1 | 11/2020 | Bartel |
| 2021/0339759 | A1* | 11/2021 | Fouad ............... B60W 60/0051 |

OTHER PUBLICATIONS

"U.S. Appl. No. 15/139,612, Examiner Interview Summary dated Oct. 19, 2018", 3 pgs.

"U.S. Appl. No. 15/139,612, Final Office Action dated Sep. 6, 2018", 10 pgs.

"U.S. Appl. No. 15/139,612, Non Final Office Action dated Mar. 21, 2018", 13 pgs.

"U.S. Appl. No. 15/139,612, Notice of Allowance dated Nov. 21, 2018", 8 pgs.

"U.S. Appl. No. 15/139,612, Response filed Feb. 2, 2018 to Restriction Requirement dated Jan. 8, 2018", 8 pgs.

"U.S. Appl. No. 15/139,612, Response filed May 22, 2018 to Non Final Office Action dated Mar. 21, 2018", 9 pgs.

"U.S. Appl. No. 15/139,612, Response filed Oct. 22, 2018 to Final Office Action dated Sep. 6, 2018", 9 pgs.

"U.S. Appl. No. 15/139,612, Restriction Requirement dated Jan. 8, 2018", 5 pgs.

"U.S. Appl. No. 16/260,663, Corrected Notice of Allowability dated May 18, 2020", 5 pgs.

"U.S. Appl. No. 16/260,663, Notice of Allowance dated Mar. 11, 2020", 9 pgs.

"U.S. Appl. No. 16/932,127, Corrected Notice of Allowability dated May 4, 2022", 2 pgs.

"U.S. Appl. No. 16/932,127, Non Final Office Action dated Oct. 1, 2021", 13 pgs.

"U.S. Appl. No. 16/932,127, Notice of Allowance dated Feb. 1, 2022", 7 pgs.

"U.S. Appl. No. 16/932,127, Preliminary Amendment filed Aug. 12, 2020", 7 pgs.

"U.S. Appl. No. 16/932,127, Response filed Dec. 30, 2021 to Non Final Office Action dated Oct. 1, 2021", 10 pgs.

"Australian Application Serial No. 2017241321, First Examination Report dated Sep. 25, 2018", 3 pgs.

"Australian Application Serial No. 2017241321, Second Examiner Report dated Jul. 26, 2019", 3 pgs.

"International Application Serial No. PCT/US2017/023411, International Search Report dated Jul. 13, 2017", 2 pgs.

"International Application Serial No. PCT/US2017/023411, Written Opinion dated Jul. 13, 2017", 6 pgs.

Al, Zhuming, et al., "Real-Time Unmanned Aerial Vehicle 3D Environment Exploration in a Mixed Reality Environment", International Conference on Unmanned Aircraft Systems, (Jun. 7-10, 2016), 664-670.

Brogan, D., et al., "Dynamically Simulated Characters in Virtual Environments", IEEE Computer Graphics and Applications, vol. 18, Issue 5, (Oct. 1998), 58-69.

Chae, et al., "The Comparison of the Detecting Performance between the Ground and the Aerial Visual Analytics in the UGV-UAV Collaborative System", International Conference on Advance Intelligent Mechatronics, (Jul. 12-15, 2016), 524-529.

Gervautz, Michael, et al., "Anywhere Interfaces Using Handheld Augmented Reality", Computer, (Jul. 2012), 26-31.

Munoz, et al., "PhysioVR: A Novel Mobile Virtual Reality Framework for Physiological Computing", International Conference one-Health Networking. Applications and Services, (Sep. 14-17, 2016), 6 pgs.

Rao, et al., "AR.-IVI—Implementation of In-Vehicle Augmented Reality", International Symposium on Mixed and Augmented Reality, (Sep. 10-12, 2014), 6 pgs.

Santano, et al., "Aerial Videography in Built-Heritage Documentation: The Case of Post-Independence Architecture of Malaysia", International Conference on Virtual Systems & Multimedia, (Dec. 9-12, 2014), 6 pgs.

Zhi-Hua, Qiao, et al., "Design of UAV Telepresence and Simulation Platform based on VR", International Conference on Cyberworlds, (Sep. 22, 2008), 520-524.

U.S. Appl. No. 15/139,612 U.S. Pat. No. 10,255,816, filed Apr. 27, 2016, Transport Vehicle Configuration for Impaired Riders.

U.S. Appl. No. 16/260,663 U.S. Pat. No. 10,720,059, filed Jan. 29, 2019, Transport Vehicle Configuration for Impaired Riders.

U.S. Appl. No. 16/932,127 U.S. Pat. No. 11,348,466, filed Jul. 17, 2020, Transport Vehicle Configuration for Impaired Riders.

* cited by examiner

TRANSPORT VEHICLE CONFIGURATION FOR IMPAIRED RIDERS

CROSS-REFERENCE TO RELATED APPLICATION

This application is a continuation of U.S. patent application Ser. No. 16/932,127, titled "Transport Vehicle Configuration for Impaired Riders," and filed on Jul. 17, 2020, which is a continuation of U.S. patent application Ser. No. 16/260,663, titled "Transport Vehicle Configuration for Impaired Riders," and filed on Jan. 29, 2019, which is a continuation of U.S. patent application Ser. No. 15/139,612, titled "Transport Vehicle Configuration for Impaired Riders," and filed on Apr. 27, 2016, each of which is hereby incorporated by reference in its entirety.

BACKGROUND

Transportation arrangement services can connect users with available transport vehicles by utilizing location-based resources of a network of connected driver devices. However, users with physical impairments may be benefited by additional services that third-party drivers and/or their vehicles may not be able to provide. Autonomous vehicle (AV) or self-driving vehicle (SDV) design and technology offers the potential to bridge many gaps currently prevalent in such transportation arrangement services.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
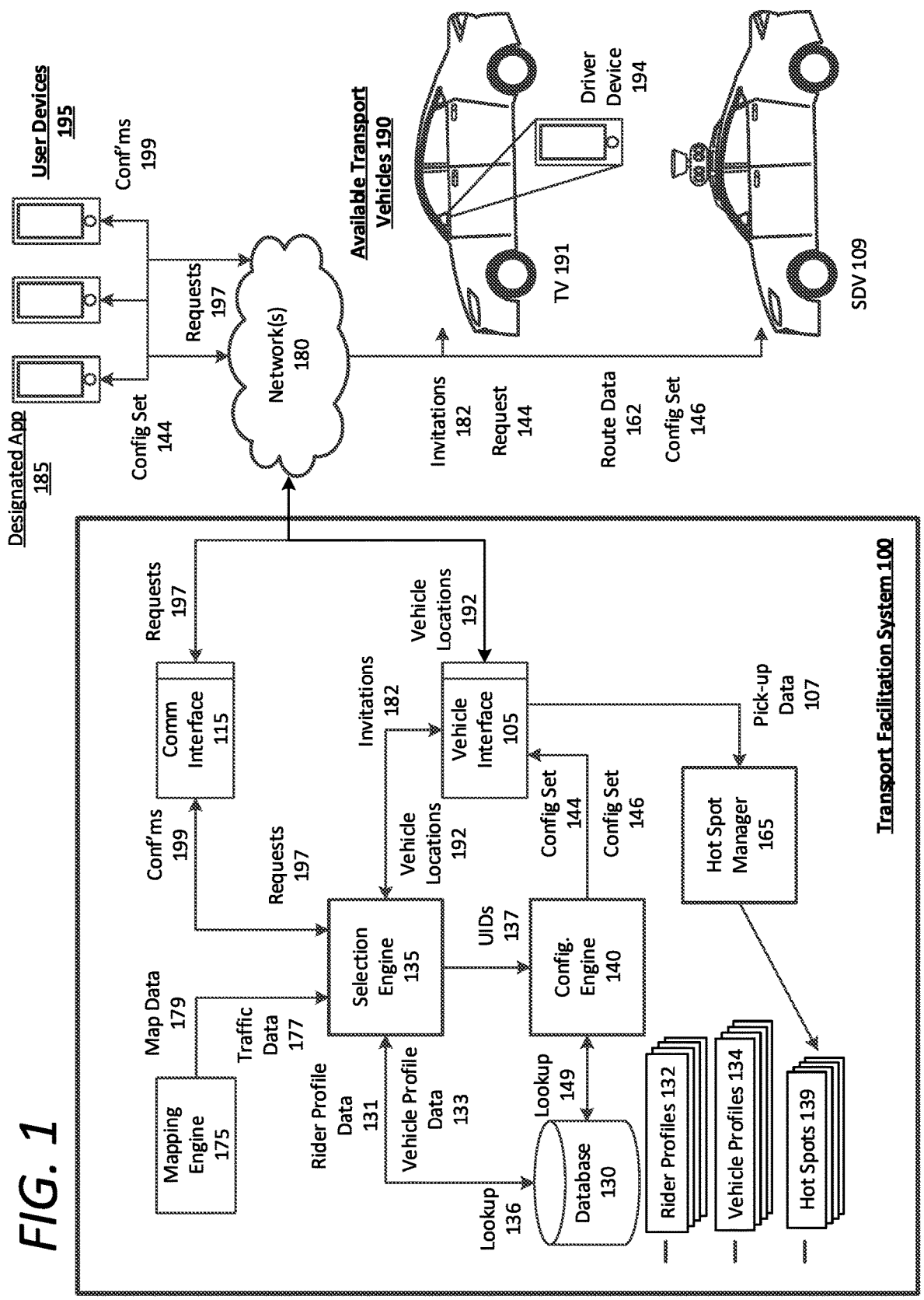
FIG. 1 is a block diagram illustrating an example transport facilitation system in communication with user devices and a fleet of transport vehicles, as described herein.

Systems and processes are disclosed herein that accommodate riders of a transportation arrangement service that have certain physical impairments, such as visual, auditory, or movement impairments. In certain aspects, a backend transportation facilitation system can create rider profiles that specify a particular impairment, and can include specific requirements for each user, such as vehicle requirements (e.g., audio, visual, or mechanical vehicle features). The transport facilitation system can receive pick-up requests from riders, access rider profiles to identify impairment information, select a transport vehicle to service the pick-up request (e.g., an AV having accommodation features for the impairment), and generate configuration sets to configure the rider devices and/or the selected vehicles based on the impairment and requirements of the rider.

For example, the transport facilitation system can accommodate a rider with a visual impairment by selecting transport vehicles that include certain audio functionality, such as exterior audio output devices, that can provide guidance to the rider in entering and exiting the vehicle. Additionally or alternatively, the transport vehicle identify the rider as the vehicle approaches the pick-up location, monitor the rider in entering the vehicle using, for example, an exterior camera (e.g., a stereo camera), provide audio assistance to the rider in entering and exiting the vehicle, output a visual notification to proximate entities (e.g., other vehicles) to use caution when the visually impaired rider is exiting the vehicle, and initiate speech recognition functions to enable the rider to control various controllable components of the vehicle (e.g., the audio system, seats, climate control system, network services, and the like) via voice commands over the duration of the ride.

In some examples, a mobile computing device is provided that executes a designated transportation service application that accommodates the user in connection with the transportation arrangement service based on the user's physical impairment. In addition to enabling the user to transmit a pick-up request for transportation from a pick-up location to a particular destination, the mobile computing device can generate a user interface to enable the user to input one or more physical impairments (e.g., via voice or touch input) and certain service requirements or preferences (e.g., standard pick-up locations, vehicle feature requirements, etc.). In various implementations, the designated application can cause the mobile computing device to perform various functions to assist the user in connection with the transportation arrangement service.

For example, the mobile computing device can monitor a selected vehicle as it approaches the pick-up location, and initiate assistance features in order to provide guidance to the user in entering and exiting the vehicle. Additionally or alternatively, the mobile computing device can generate a control interface and connect locally with the service vehicle to enable the user to adjust various components of the vehicle, such as the seats, climate control system (e.g., temperature, fan speed, and fan direction), windows, audio system, display system, network service features, and the like. In some examples, such as for visually impaired users, the designated application can cause the mobile computing device to execute speech recognition to enable the user to provide voice inputs in order to control such components. Additionally or alternatively, the designated application can cause the mobile computing device to generate a visual control interface to enable the user to control such features.

Among other benefits, the examples described herein achieve a technical effect of accommodating users of a transportation arrangement service that have physical impairments via a backend transport facilitation system. Such accommodations can be facilitated by the transport facilitation system that manages the transportation arrangement service, accommodation features of a selected vehicle (e.g., an autonomous vehicle or self-driving car), and/or the rider's mobile computing device.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Numerous examples are referenced herein in context of an autonomous vehicle (AV) or self-driving vehicle (SDV). An AV or SDV refers to any vehicle which is operated in a state of automation with respect to steering and propulsion. Different levels of autonomy may exist with respect to AVs and SDVs. For example, some vehicles may enable automation in limited scenarios, such as on highways, provided that drivers are present in the vehicle. More advanced AVs and SDVs can drive without any human assistance from within or external to the vehicle.

SYSTEM DESCRIPTION

FIG. 1 is a block diagram illustrating an example transport facilitation system in communication with user devices and a fleet of transport vehicles, as described herein. The transport facilitation system 100 can include a communications interface 115 to communicate with the user devices 195 and the fleet of available transport vehicles 190 over a number of networks 180. In addition or in variations, the transport facilitation system 100 can communicate with human drivers operating transport vehicles (e.g., transport vehicle 191), via driver devices 194, to facilitate transportation in accordance with a transportation arrangement service managed by the transport facilitation system 100. In many examples, the transport facilitation system 100 can provide the transportation arrangement service to link requesting users with transport vehicles and/or AVs or SDVs in the transport vehicle fleet 190 managed by the transport facilitation system 100. Such vehicles 190 may be vehicles managed by the transport facilitation system 100 (e.g., a fleet of AVs or SDVs), or vehicles owned by third-party entities (e.g., human-driven vehicles, AVs, or SDVs) that are available to service pick-up requests 197. A designated application 185 corresponding to the transportation arrangement service can be executed on the user devices 195. A requesting user can provide an input on a user device 195 to transmit a pick-up request 197 to the transport facilitation system 100. The pick-up request 197 can be received by the communications interface 115 and sent to a selection engine 135, which can match the requesting user with a proximate transport vehicle, in relation to a pick-up location, from the fleet of available vehicles 190.

In one or more examples, the pick-up request 197 can include a pick-up location where a selected SDV 109 or transport vehicles 191 can rendezvous with the requesting user. The fleet of available vehicles 190 can be dispersed throughout a given region (e.g., a city or metropolitan area) and transmit vehicle location data 192 to a vehicle interface 105 of the transport facilitation system 100. The vehicle interface 105 can transmit the vehicle locations 192 to the selection engine 135 in order to enable the selection engine 135 to determine candidate vehicles that can readily service the pick-up request 197.

In certain implementations, the transport facilitation system 100 can identify that the pick-up location corresponds to a typically crowded area that has been historically difficult to coordinate pick-ups. For example, a hot spot manager 165 of the transport facilitation system 100 can record historical pick-up data 107 from a given area (e.g., surrounding a sporting facility, mall, or airport), and determine a specified location or multiple locations around the area that result in the least time for a particular rendezvous. In one aspect, the pick-up data 107 can include timing information indicating an average for how long it takes to pick-up a requesting user once the transport vehicle is within a certain distance or time from the area. Additionally or alternatively, the pick-up data 107 can indicate additional time or scheduling information that indicates a time of day (e.g., rush hour) or a particular event (e.g., a sporting event, concert, or other crowd source). The hot spot manager 165 can compile such pick-up data 107 to identify one or more most optimal pick-up locations (i.e., hot spots 139) that can minimize rendezvous times. For example, the hot spot manager 165 can (i) identify problematic rendezvous instances between transport vehicles and users in a respective crowded area over a duration of time, (ii) identify seamless rendezvous instances in the historical pick-up data 107 between transport vehicles and users in the respective crowded area over the duration of time, (iii) determine an optimal location corresponding to the seamless rendezvous instances and not the problematic rendezvous instances, and (iv) establish the optimal location as the respective hotspot location for the respective crowded area. Thereafter, the hotspot manager 165 can store the hot spot location, correlated to the particular crowded area, in the hot spot list 139 of the database 130. Further, each hot spot in the list 139 can include metadata that indicates a respective area to which the hot spot pick-up location pertains.

According to examples described herein, the transport facilitation system 100 can further compile and store rider profiles 132 in a database 130 that can indicate vehicle requirements for each user. In certain aspects, the designated application 185 on the user device 195 of a user that has a physical impairment (e.g., visual, auditory, or movement) can generate a user interface enabling the user to create such a rider accessibility profile 132 so that the selection engine 135 can consult the profile 132 prior to selecting a vehicle for the impaired user to service a pick-up request 197. Additionally, the rider profiles 132 can include default pick-up locations for requesting users when a pick-up location inputted in a pick-up request 197 falls within a particular area (e.g., within fifty feet of the user's home). The requesting user can configure such locations via the designated application 185 prior to submitting the pick-up request 197. For example, a user can be provided with an application configuration screen that enables the user to set specified pick-up locations and/or notes for a driver when submitting any pick-up request 197 indicating a pick-up location within a predetermined area. In one example, the pick-up location can be inputted by the user setting a virtual location pin on a mapping resource of the designated application 185. Accordingly, the rider profile 132 can further include such default pick-up locations, and the selection engine 140 can transmit specific details and/or notes concerning the default pick-up location to the driver device 194 or SDV 109.

Furthermore, the transport facilitation system 100 can store vehicle profiles 134 for each available transport vehicle 190 indicating the various features of that vehicle. In many examples, the vehicle profile 134 can indicate the vehicle type, color, badge or license plate number, available seats and/or cargo space, and various other features corresponding to the vehicle. Additionally, the vehicle profile 134 can indicate whether the vehicle is an autonomous or self-driving vehicle, and/or whether the vehicle has certain accommodation features for rider with physical impairments.

As used herein, such "accommodation features" can include specialized vehicle features that can assist a rider that has one or more physical impairments, such as a visual, auditory, or movement impairment. Such accommodation features can include automatic doors, a trunk or side lift gate, an exterior audio system, an external monitoring system (e.g., a sensor array to monitor rider ingress and egress), speech recognition features, an exterior notification system, and the like. Accordingly, such accommodation features can comprise vehicle features that can directly assist a user to mitigate the effects of the user's physical impairments.

When a pick-up request 197 is received via the communications interface 115, the selection engine 135 can perform a lookup 136 in the database 130 to access rider profile data 131 from the rider profile 132 corresponding to the requesting user, and determine whether the requesting user has a physical impairment. The selection engine 135 can further process the rider profile data 131 to determine whether the requesting user has any requirements or preferences, such as a vehicle type, a preferred pick-up location, or any preferred features of the requested transport vehicle (e.g., network services, entertainment features, etc.). Additionally, the selection engine 135 can identify whether the inputted pick-up location is within a predetermined area correlated to a hot spot pick-up location 139. If so, then the resultant route data 162 to a selected transport vehicle can reflect the hot spot location 139 and the selection engine 135 can transmit a confirmation 199 to the requesting user's device 195 requesting that the user meet the selected transport vehicle at the hot spot location 139. Still further, the selection engine 135 can perform a lookup 136 in the rider profile 132 of the requesting user to determine whether the inputted pick-up location is within a predetermined area of a default pick-up location (e.g., the user's home or work). If so, the selection engine 135 can identify the default pick-up location (e.g., at the end of the user's driveway or on a specified curbside location), and transmit a request to the selected transport vehicle to rendezvous with the user at the default location.

Utilizing the foregoing rider profile data 131 and the vehicle locations 192, the selection engine 135 can identify a set of transport vehicles 191 and/or SDVs 109 proximate to the requesting user (e.g., within a predetermined distance or time from the pick-up location), and perform a lookup 136 for vehicle profile data 133 in the vehicle profiles 134 of the proximate vehicles to determine one or more optimal vehicles to service the pick-up request 197. In certain aspects, the selection engine 135 can further utilize a mapping engine 175 to determine the candidate optimal vehicles based on map data 179 (e.g., a distance to the pick-up location) and/or traffic data 177 (e.g., a time to reach the pick-up location). In selecting the most optimal vehicle to service the pick-up request 197, the selection engine 135 can perform an optimization technique based on the requesting user's physical impairment, the vehicle features (e.g., the accommodation features) for each proximate vehicle indicated in the vehicle profile data 133, the requirements and/or preferences indicated in the rider profile data 131 of the requesting user, and the distance and/or time indicated in the map data 179 and traffic data 177.

For example, if the rider profile data 131 indicates that the requesting user has a visual impairment, the selection engine 135 can prioritize proximate vehicles that include additional accommodation features, such as pedestrian monitoring systems (e.g., a sensor array that monitors a physical or situational environment of the SDV 109), exterior audio guidance features, automatic doors, and/or notification features for oncoming traffic. If none of the proximate vehicles include such accommodation features, then the selection engine 135 can either expand the search area or select a next best vehicle from the proximate group. In the example provided, the selection engine 135 can identify SDV 109 in the proximate vehicles as having accommodation features for the visually impaired user.

In some examples, the transport facilitation system 100 can pre-profile human drivers as trusted drivers to accommodate the requirements of physically impaired users. For example, the vehicle profiles 134 can also indicate human qualifications or ratings for the drivers of the corresponding vehicles. In one example, the optimization technique performed by the selection engine 135 can balance between the accommodation features of SDV 109 and, for example, the fact that transport vehicle 191 has a highly rated driver that has experience in accommodating the requirements of users with certain physical impairments (e.g., visual blindness). In such situations, the selection engine 135 can generate a ranking for each of the proximate vehicles (e.g., between one and one hundred) to identify the most optimal vehicle to service the pick-up request 197. As an example, the selection engine 135 may generate high scores for transport vehicle 191 and SDV 109 based on their respective accommodation features, the qualifications and experience of the driver of transport vehicle 191, and their respective locations relative to the pick-up location. However, the selection engine 135 may slightly favor SDV 109 for, as an example, including a favorable accommodation feature such as an exterior audio assistance feature, or for being closer to the pick-up location. Alternatively, the selection engine 135 may favor transport vehicle 191 if the rider profile data 131 for the requesting user indicates that human assistance is most desirable (e.g., for movement impaired elderly user).

When the selection engine 135 selects a human-driven vehicle 191, the selection engine 135 can generate and transmit an invitation 192, to the driver device 194 of the driver for the transport vehicle 191, to service the pick-up request 197. In such examples, the driver may accept or deny the invitation 182 via input on the driver device 194. If the invitation 182 is accepted, the selection engine 135 can generate and transmit a confirmation 199 to the requesting user's device 195 indicating identifying information of transport vehicle 191 and/or its driver. Furthermore, in some examples, the selection engine 135 can utilize the mapping engine 175 to transmit route data 162 to the driver device 194 of transport vehicle 191. The route data 162 can indicate a shortest route to the pick-up location, and can further provide a route from the pick-up location to the destination.

In certain implementations, upon selecting SDV 109 as being the most optimal vehicle, the selection engine 135 can transmit an invitation 182 to SDV 109 to service the pick-up request 197. In some examples, SDV 109 can accept or deny the invitation depending on a number of factors (e.g., remaining fuel or energy, service indicators, owner requirements, etc.). In some examples, when SDV 109 accepts the invitation 182, the transport facilitation system 100 can utilize the map data 179 and traffic data 177 to provide SDV 109 with route information indicating a shortest or most optimal route to the pick-up location. Alternatively, SDV 109 may be provided with local mapping resources to identify the most optimal route independently.

According to examples described herein, the transport facilitation system 100 can further include a configuration engine 140 that can access the rider profiles 132 and vehicle profiles 134 to generate configuration sets 144, 146 for the user device 195 and/or selected transport vehicle (e.g., SDV 109). In one example, the configuration engine 140 can receive unique identifiers 137 corresponding to the requesting user's device 195 and the matched vehicle. Utilizing the unique identifiers 137, the configuration engine 140 can perform lookups 149 in the rider profile 132 and the vehicle profile 134 in the database 130 to determine an optimal set of configurations 144, 146 to configure at least one of the requesting user's device 195 or the selected vehicle.

For example, upon selection of a human driven transport vehicle 191, the configuration engine 140 can transmit a request 144 to the driver device 194 to notify the driver of the requesting user's physical impairment. In some examples, the request 144 can include a request to configure the transport vehicle 191 in a certain manner to accommodate the requesting user's physical impairment. For example, the request 144 can invite the driver to set up audio and/or visual features of the transport vehicle 191, make space for a movement impaired user, enable an audio assist feature for a visually impaired user (e.g., a speech recognition entertainment system), and/or enable a visual assist feature (e.g., generating push notifications on a display visible to the user).

Autonomous vehicles or self-driving vehicles may offer additional accommodation features independent of a human driver. Thus, upon selection of an SDV 109 to service the pick-up request 197, the configuration engine 140 generate and transmit a configuration set 146 to configure various components of the SDV 109 based on the requesting user's physical impairment and/or preferences. For example, the configuration engine 140 can identify, from the ride profile data 131, that the requesting user is visually impaired. The configuration engine 140 can then determine, from the vehicle profile data 133 of SDV 109, the various accommodation features available. For example, the SDV 109 may include features such as automatic doors, an external audio assistance feature, and/or a rider monitoring system. Based on the available accommodation features, the configuration engine 140 can generate a configuration set 146 to configure and/or enable the accommodation features on SDV 109 in servicing the pick-up request 197. Further description of the execution of the configuration set 146 on the SDV 109 is provided bed below in connection with FIG. 2.

Additionally or alternatively, the configuration engine 140 can generate a configuration set 144 to configure the requesting user's mobile computing device 195 through the designated application 185. For example, for a visually impaired user, the configuration set 144 can cause the mobile computing device 195 to initiate an audio assistance mode that tracks the selected transport vehicle as it approaches the pick-up location, and provides audio assistance to the user accordingly. Furthermore, for SDV 109 implementations, upon entering the SDV 109, the configuration set 144 can cause the user device 195 to generate a control interface to control various components of the SDV 109, and can be customized to accommodate the physical impairment of the user. Further description of the execution of the configuration set 144 on the requesting user's device is provided below in connection with FIG. 3.

Figure 2:
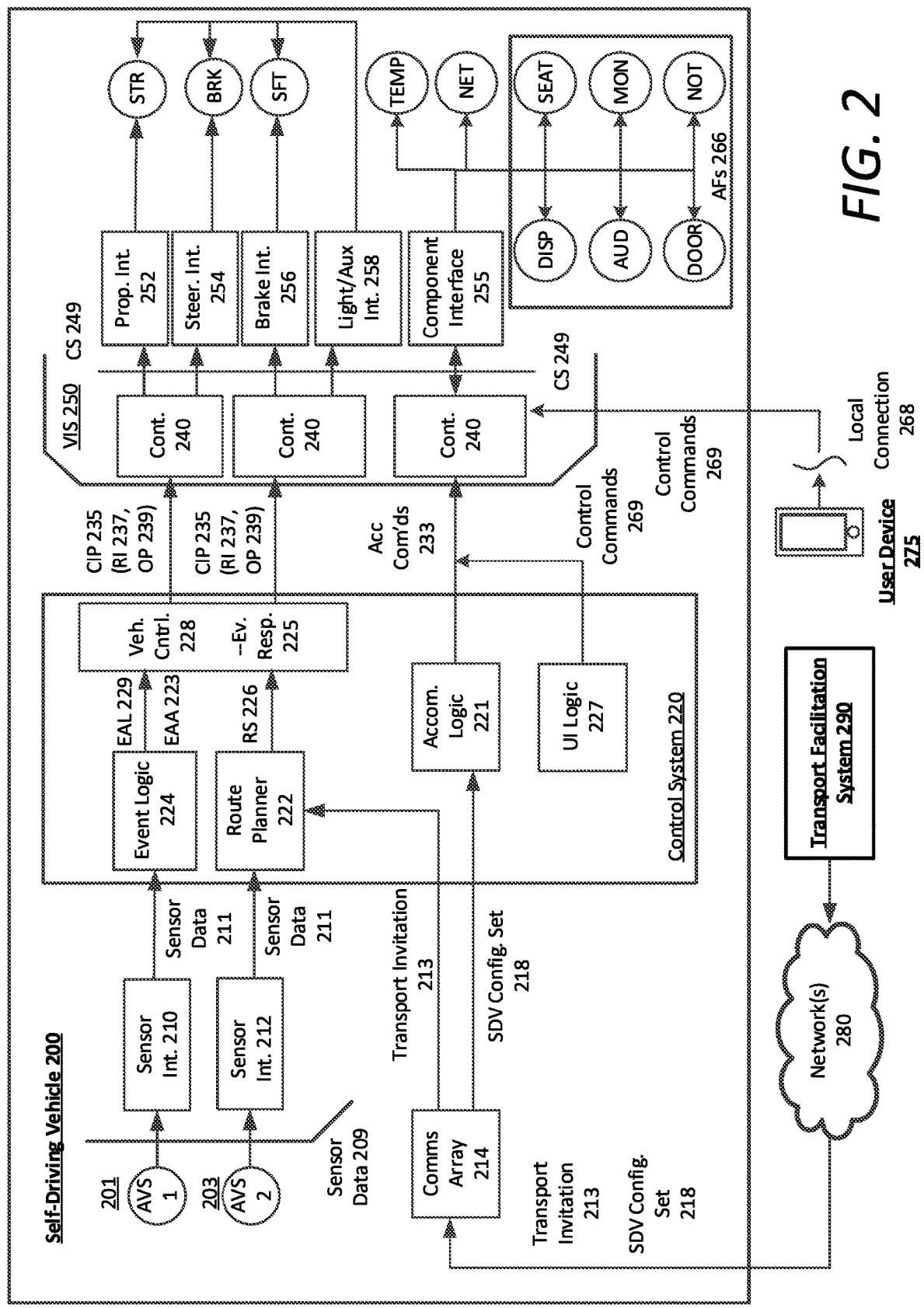
FIG. 2 is a block diagram illustrating an example AV or SDV implementing a control system, as described herein.

FIG. 2 is a block diagram illustrating an example AV or SDV implementing a control system, as described herein. In an example of FIG. 2, a control system 220 can autonomously operate the SDV 200 in a given geographic region for a variety of purposes, including transport services (e.g., transport of humans, delivery services, etc.). In examples described, an autonomously driven vehicle can operate without human control. For example, in the context of automobiles, an autonomously driven vehicle can steer, accelerate, shift, brake, and operate lighting components. Some variations also recognize that an autonomous-capable vehicle can be operated either autonomously or manually.

According to some examples, the SDV 200 can include a wireless communication interface or communications array 214 to communicate with a backend, transport facilitation system 290, such as those described with respect to FIG. 1. Furthermore, the SDV 200 can include a number of adjustable components that affect a seating or an environment of the vehicle, and one or more controllers 240 to control a setting for each of the adjustable components (e.g., lighting, seat adjustments, audio system, etc.). Thus, as described herein in with respect to the SDV 200, the controller 240 of the service vehicle (whether an AV, SDV, or a human-driven vehicle) can receive a set of instructions from a network service (e.g., transportation arrangement service provided by the transport facilitation system 290) via the wireless communication interface 214, and implement a configuration set 218 to set up and/or configure a number of accommodation components or features 266 of the SDV 200 to assist a physically impaired user. In some examples, the configuration set 218 can be received from the transport facilitation system 290 over a network 280

In one implementation, the control system 220 can utilize specific sensor resources in order to intelligently operate the vehicle 200 in most common driving situations. For example, the control system 220 can operate the vehicle 200 by autonomously operating the steering, accelerating, and braking systems of the vehicle 200 as the vehicle progresses to a destination. The control system 220 can perform vehicle control actions (e.g., braking, steering, accelerating) and route planning using sensor information, as well as other inputs (e.g., transmissions from remote or local human operators, network communication from other vehicles, etc.).

In an example of FIG. 2, the control system 220 includes a computer or processing system which operates to process sensor data that is obtained on the vehicle 200 with respect to a road segment upon which the vehicle 200 operates. The sensor data can be used to determine actions which are to be performed by the vehicle 200 in order for the vehicle 200 to continue on a route to a destination. In some variations, the control system 220 can include other functionality, such as wireless communication capabilities, to send and/or receive wireless communications with one or more remote sources. In controlling the vehicle 200, the control system 220 can issue instructions and data, shown as commands 235, which programmatically control various electromechanical interfaces of the vehicle 200. The commands 235 can serve to control operational aspects of the vehicle 200, including propulsion, braking, steering, and auxiliary behavior (e.g., turning lights on). In examples described herein, the commands 235 can include accommodation commands 233, which can further serve to control configurable interior systems of the SDV 200 via a component interface 255, such as seating configurations, seat positioning, seat adjustment, seat heating or cooling, an audio system, a display setup, a climate control system, an interior lighting system, windows, and/or a sunroof or moon roof.

The SDV 200 can be equipped with multiple types of sensors 201, 203 which can combine to provide a computerized perception of the space and the physical environment surrounding the vehicle 200. Likewise, the control system 220 can operate within the SDV 200 to receive sensor data 211 from the collection of sensors 201, 203, and to control various electromechanical interfaces for operating the vehicle 200 on roadways.

In more detail, the sensors 201, 203 operate to collectively obtain a complete sensor view of the vehicle 200, and further to obtain situational information proximate to the vehicle 200, including any potential hazards proximate to the vehicle 200. By way of example, the sensors 201, 203 can include multiple sets of cameras sensors 201 (video cameras, stereoscopic pairs of cameras or depth perception cameras, long range cameras), remote detection sensors 203 such as provided by radar or LIDAR, proximity or touch sensors, and/or sonar sensors (not shown).

Each of the sensors 201, 203 can communicate with the control system 220 utilizing a corresponding sensor interface 210, 212. Each of the sensor interfaces 210, 212 can include, for example, hardware and/or other logical components which are coupled or otherwise provided with the respective sensor. For example, the sensors 201, 203 can include a video camera and/or stereoscopic camera set which continually generates image data of the physical environment of the vehicle 200. As an addition or alternative, the sensor interfaces 210, 212 can include a dedicated processing resource, such as provided with a field programmable gate array ("FPGA") which can, for example, receive and/or process raw image data from the camera sensor.

In some examples, the sensor interfaces 210, 212 can include logic, such as provided with hardware and/or programming, to process sensor data 209 from a respective sensor 201, 203. The processed sensor data 209 can be outputted as sensor data 211. As an addition or variation, the control system 220 can also include logic for processing raw or pre-processed sensor data 209.

According to one implementation, the vehicle interface subsystem 250 can include or control multiple interfaces to control mechanisms of the vehicle 200. The vehicle interface subsystem 250 can include a propulsion interface 252 to electrically (or through programming) control a propulsion component (e.g., an accelerator actuator), a steering interface 254 for a steering mechanism, a braking interface 256 for a braking component, and a lighting/auxiliary interface 258 for exterior lights of the vehicle 200. According to implementations described herein, control signals 249 can further be transmitted to a component interface 255 of the vehicle interface subsystem 250 to control various components and/or accommodation features 266 of the SDV 200 based on, for example, a physical impairment of the user. The vehicle interface subsystem 250 and/or the control system 220 can further include one or more controllers 240 which can receive commands 233, 235 from the control system 220. The commands 235 can include route information 237 and operational parameters 239—which specify an operational state of the vehicle 200 (e.g., desired speed and pose, acceleration, etc.). The commands can further include accommodation commands 233 to cause the controller 240 to configure a number of adjustable components of the SDV 200 via the component interface 255.

The controller(s) 240 can generate control signals 249 in response to receiving the commands 233, 235 for one or more of the vehicle interfaces 252, 254, 255, 256, 258. The controllers 240 can use the commands 235 as input to control propulsion, steering, braking, and/or other vehicle behavior while the SDV 200 follows a current route. Thus, while the vehicle 200 actively drives along the current route, the controller(s) 240 can continuously adjust and alter the movement of the vehicle 200 in response to receiving a corresponding set of commands 235 from the control system 220. Absent events or conditions which affect the confidence of the vehicle 220 in safely progressing along the route, the control system 220 can generate additional commands 235 from which the controller(s) 240 can generate various vehicle control signals 249 for the different interfaces of the vehicle interface subsystem 250.

According to examples, the commands 235 can specify actions to be performed by the vehicle 200. The actions can correlate to one or multiple vehicle control mechanisms (e.g., steering mechanism, brakes, etc.). The commands 235 can specify the actions, along with attributes such as magnitude, duration, directionality, or other operational characteristics of the vehicle 200. By way of example, the commands 235 generated from the control system 220 can specify a relative location of a road segment which the SDV 200 is to occupy while in motion (e.g., changing lanes, moving into a center divider or towards shoulder, turning the vehicle, etc.). As other examples, the commands 235 can specify a speed, a change in acceleration (or deceleration) from braking or accelerating, a turning action, or a state change of exterior lighting or other components. The controllers 240 can translate the commands 235 into control signals 249 for a corresponding interface of the vehicle interface subsystem 250. The control signals 249 can take the form of electrical signals which correlate to the specified vehicle action by virtue of electrical characteristics that have attributes for magnitude, duration, frequency or pulse, or other electrical characteristics.

In an example of FIG. 2, the control system 220 can include a route planner 222, event logic 224, accommodation logic 221, and a vehicle control 228. The vehicle control 228 represents logic that converts alerts of event logic 224 ("event alert 229") into commands 235 that specify a set of vehicle actions.

Additionally, the route planner 222 can select one or more route segments 226 that collectively form a path of travel for the SDV 200 when the vehicle 200 is on a current trip (e.g., servicing a pick-up request). In one implementation, the route planner 222 can specify route segments 226 of a planned vehicle path which defines turn by turn directions for the vehicle 200 at any given time during the trip. The route planner 222 may utilize the sensor interface 212 to receive GPS information as sensor data 211. The vehicle control 228 can process route updates from the route planner 222 as commands 235 to progress along a path or route using default driving rules and actions (e.g., moderate steering and speed).

In certain implementations, the event logic 224 can trigger a response to a detected event. A detected event can correspond to a roadway condition or obstacle which, when detected, poses a potential hazard or threat of collision to the vehicle 200. By way of example, a detected event can include an object in the road segment, heavy traffic ahead, and/or wetness or other environmental conditions on the road segment. The event logic 224 can use sensor data 211 from cameras, LiDAR, radar, sonar, or various other image or sensor component sets in order to detect the presence of such events as described. For example, the event logic 224 can detect potholes, debris, objects projected to be on a collision trajectory, and the like. Thus, the event logic 224 can detect events which enable the control system 220 to make evasive actions or plan for any potential hazards.

When events are detected, the event logic 224 can signal an event alert 229 that classifies the event and indicates the type of avoidance action to be performed. Additionally, the control system 220 can determine whether an event corresponds to a potential incident with a human driven vehicle, a pedestrian, or other human entity external to the SDV 200. In turn, the vehicle control 228 can determine a response based on a score or classification of the event. Such response can correspond to an event avoidance action 223, or an action that the vehicle 200 can perform to maneuver the vehicle 200 based on the detected event and its score or classification. By way of example, the vehicle response can include a slight or sharp vehicle maneuvering for avoidance using a steering control mechanism and/or braking component. The event avoidance action 223 can be signaled through the commands 235 for controllers 240 of the vehicle interface subsystem 250.

When an anticipated dynamic object of a particular class does in fact move into position of likely collision or interference, some examples provide that event logic 224 can signal the event alert 229 to cause the vehicle control 228 to generate commands 235 that correspond to an event avoidance action 223. For example, in the event of a bicycle crash in which the bicycle (or bicyclist) falls into the path of the vehicle 200, the event logic 224 can signal the event alert 229 to avoid the collision. The event alert 229 can indicate (i) a classification of the event (e.g., "serious" and/or "immediate"), (ii) information about the event, such as the type of object that generated the event alert 229, and/or information indicating a type of action the vehicle 200 should take (e.g., location of object relative to path of vehicle, size or type of object, etc.).

According to examples described herein, SDV 200 can include a communications array 214 to communicate over one or more networks 280 with a backend, transport facilitation system 290, such as the transport facilitation system 100 described with respect to FIG. 1. In some aspects, when the SDV 200 is selected to service a pick-up request, the communications array 214 can receive a transport invitation 213 from the transport facilitation system 290 to service the pick-up request and drive to a pick-up location to rendezvous with the requesting user. In such aspects, the transport invitation 213 can be transmitted to the route planner 222 in order to autonomously drive the SDV 200 to the pick-up location. In conjunction with or subsequent to receiving the transport invitation 213, the communications array 214 can receive an SDV configuration set 218 from the transport facilitation system 290 to personalize the various configurable components of the SDV 200 for the upcoming rider.

The SDV configuration set 218 can be processed by the accommodation logic 221 of the control system 220 which can generate a set of accommodation commands 233 for execution by a controller 240 for the component interface 255. In many examples described herein, the accommodation logic 227 being executed by one or more processors can comprise a physical impairment accommodation system of the SDV 200. The physical impairment accommodation system can be implemented as part of the control system 220 specifically to accommodate rider's that have some type of physical impairment, such as a visual, auditory, or movement impairment. Execution of the accommodation commands 233 by the controller 240 can configure certain specialized SDV components—such as the accommodation features 266 of the SDV 200. For example, based on the user's physical impairment, the SDV 200 can receive a configuration set 218 from the transport facilitation system 290, which can be processed by the accommodation logic 221 to generate a set of accommodation commands 233 executable on one or more of the accommodation features 266 of the SDV 200. For example, the SDV configuration set 218 can cause the accommodation logic 221 to generate commands 233 to initiate an external audio assistance feature, a rider monitoring system, and a notification system for a visually impaired user. The SDV 200 can receive the SDV configuration set 218 while the SDV 200 is en route to the pick-up location such that the accommodation commands 233 can be executed on the accommodation features 266 when the SDV 200 arrives at the pick-up location.

In one aspect, the SDV configuration set 218 can cause the SDV 200 to execute commands 233 targeted for a specified physical impairment over a trip duration between a pick-up location and a destination. For example, the accommodation features 266 of the SDV 200 can include certain features to aid movement impaired users, such as a lift gate and wheelchair space. As another example, the accommodation features 266 can include features to aid hearing impaired users, such as notification and touch display features. Still further, the accommodation features 266 can include features to assist visually impaired users, such as an external pedestrian monitoring system, an external audio assistance feature, automatic doors, and a an external notification system to notify proximate entities to use extra caution.

According to examples, the external audio system can be executed in conjunction with an external monitoring system as the SDV 200 approaches a visually impaired requesting user. For example, the monitoring system can utilize one or more sensors 201, 203 of the AV's sensory array to identify the user as the SDV 200 approaches the pick-up location. In one example, if the requesting user is not precisely at the pick-up location, the control system 220 can override the inputted pick-up location (e.g., the pick-up location indicated in the transport invitation 213), and operate the acceleration 252, braking 256, and steering systems 254 of the SDV 200 to maneuver the SDV 200 to the curbside next to the visually impaired user. Once the SDV 200 approaches the user, the accommodation logic 221 can implement the accommodation commands 233 to, for example, automatically open a door proximate to the user (e.g., a rear curbside door, and provide audio assistance using an audio system and the monitoring system of the SDV 200 if needed. Additionally or alternatively, the accommodation logic 221 can further utilize the audio system to greet the user with an audio greeting by name. For example, the name of the user can be included in the transportation invitation 213, and can be utilized by the accommodation logic 221 for the audio greeting. Furthermore, for a hearing impaired user, the accommodation commands 233 can be executed to provide a visual greeting using the user's name via an externally viewable display system.

Once the user enters the SDV 200, the user's physical impairments may not allow for easy control over the SDV's controllable components, such as the climate control system, network services (e.g., entertainment, VR/AR features, conferencing, phone calling, gaming, etc.), seat adjustment controls, display controls, audio system controls, windows, mirrors, sunroof, and the like. According to some examples, the control system 220 of the SDV 200 can further include user interface logic 227 to enable the user to readily control such features when inside the SDV 200. The user interface logic 227 can be executed in multiple modes, such as a default mode for typical riders, or specialized accommodation modes based on the physical impairment of the rider.

In one aspect, the user interface logic 227 can automatically execute a speech recognition control mode based on the SDV configuration set 218 indicating pick-up of a visually impaired rider. Thus, when the rider enters the SDV 200, the rider can readily control various features, such as seat adjustments, the audio system, network services, and the climate control system, using solely voice commands. The user's spoken words can be processed by the user interface logic 227 and translated into a set of control commands 269 to that can be executed by the controller 240 on the specified components. For example, the user can enter the SDV 200 and wish to adjust the seat. The user can provide a set of intuitive commands, such as "adjust seat," which can trigger the user interface logic 227 to enter a seat adjustment sub-mode. Thereafter, any commands spoken by the user, such as "seat forward," "seat backward," "seatback forward," "seat height up," etc., can be translated by the user interface logic 227 into commands to adjust the seat accordingly.

As another example, the user can access and browse audio channels on the SDV 200 to listen to music or entertainment programs, or access network services to, for example, play a game or perform work functions (e.g., make calls or join a conference). An initial speech command can set the sub-mode in the speech recognition control mode. Furthermore, account information for the user from the transport facilitation system 290 can be transmitted in the SDV configuration set 218 to set various profile settings for the user, such as a contacts list, network access settings, favorite apps or websites, and the like. Thus, if the user wishes to make a phone call, the user can provide intuitive speech commands to the user interface logic 227 to initiate the "network services—phone" sub-mode, and speak a name that corresponds to the user's contact list. The user interface logic 227 can perform a lookup in the user's contact list (e.g., provided in the profile data of the SDV configuration set), and generate control commands 269 to execute the phone call.

Further modes can be executed on the user interface logic 227 based on physical impairment. For example, the user interface logic 227 can execute a visual recognition control mode for hearing impaired riders. In such a mode, the display of the SDV 200 can provide various touch and haptic feedback along with additional text features, such as captioning and push notifications in order to enable the user to control the various SDV components. In one example, the SDV 200 can further include an interior monitoring system (e.g., one or more network connected cameras), to enable the hearing impaired rider to conduct video calls or conferences using sign language. Thus, the SDV configuration set 218 can indicate the hearing impaired user and can provide profile data for the user. The user interface logic 227 can automatically execute the visual recognition control mode to enable the rider to interact with and control the various components of the SDV 200 using touch inputs and/or, in one example, sign language inputs that can be detected by an interior camera. Such inputs can initiate the sub-mode that enables the user to control a specific one of the components. Thereafter, user inputs can be translated by the user interface logic 227 to generate control commands 269 to control the specified component accordingly. Furthermore, in the visual recognition control mode, the user interface logic 227 can automatically provide text captioning on any viewed content, including during video calls or conferencing.

Additionally or alternatively, the user may be enabled to control the controllable features of the SDV 200 using the user's mobile computing device 275. Thus, upon the requesting user entering the SDV 200, the SDV 200 can establish a local secure connection 268 with the user's device 275 (e.g., a Bluetooth, Wi-Fi, or WiGig connection) that enables the user to readily control these various components. For example, a movement impaired user may not be able to physically access the control features for certain components. Thus, upon establishing the local secure connection 268, a control interface can be generated on the designated application on the user's device 275 to enable the user to control the various components. In one example, the user device 275 can execute a speech recognition mode to enable the user to provide voice inputs that are translated, on the user device 275 through the designated application, into control commands 269 that can be transmitted over the local connection 268 to the controller 240, to implement the commands 269 on the specified components, as described herein. Additionally or alternatively, the user device 275 can generate a control interface including a menu listing the SDV features, and that enables the user to control various aspects on the control interface accordingly, as described herein.

Figure 3:
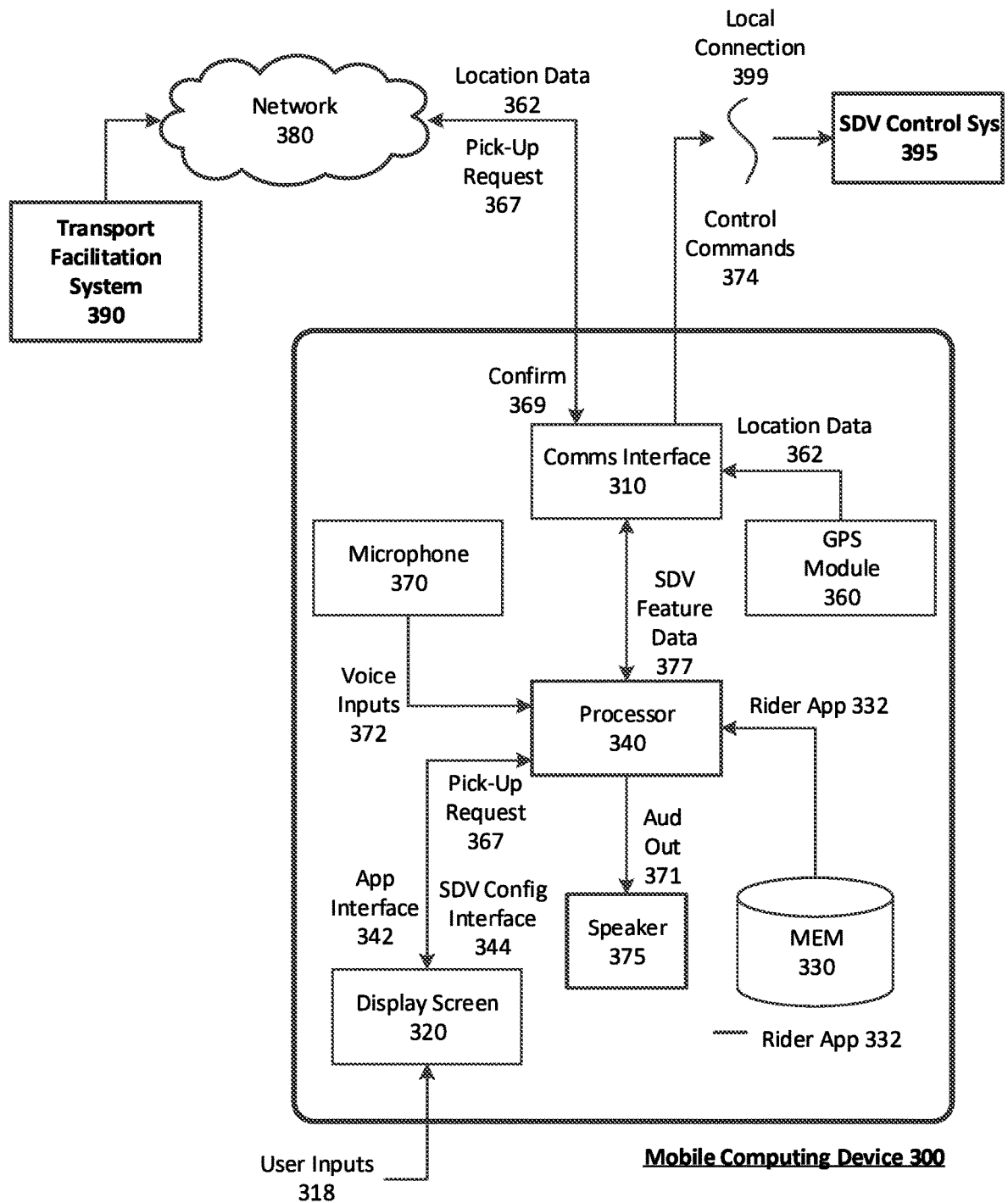
FIG. 3 is a block diagram illustrating an example mobile computing device executing a designated application for a transport arrangement service, as described herein.

FIG. 3 is a block diagram illustrating an example mobile computing device executing a designated application for a transport arrangement service, as described herein. The mobile computing device 300 can store a designated application (e.g., a rider app 332) in a local memory 330. In response to a user input 318, the rider app 332 can be executed by a processor 340, which can cause an app interface 342 to be generated on a display screen 320 of the mobile computing device 330. The app interface 342 can enable the user to, for example, check current price levels and availability for the transportation arrangement service. In various implementations, the app interface 342 can further enable the user to select from multiple ride services, such as a carpooling service, a regular rider service, a professional rider service, a van transport service, a luxurious ride service, and the like. Example services that may be browsed and requested can be those services provided by UBER Technologies, Inc. of San Francisco, Calif.

The user can generate a pick-up request 367 via user inputs 318 provided on the app interface 342. For example, the user can select a pick-up location, view the various service types and estimated pricing, and select a particular service for transportation to an inputted destination. In certain implementations, current location data 362 from a GPS module 360 of the mobile computing device 300 can be transmitted to the transport facilitation system 390 to set the pick-up location. In many examples, the user can also input the destination prior to pick-up. The processor 340 can transmit the pick-up request 367 via a communications interface 310 to the backend transport facilitation system 390 over a network 380. In response, the mobile computing device 300 can receive a confirmation 369 from the transport facilitation system 390 indicating the selected SDV that will service the pick-up request 367 and rendezvous with the user at the pick-up location.

In one or more examples, the rider app 332 can also generate an SDV configuration interface 344 so that the user can set preferences and/or configure the interior components of the SDV when the user enters the SDV. In one aspect, the SDV configuration interface 344 can be generated automatically when the confirmation 369 is received from the transport facilitation system 390. Thus, the confirmation 369 can further include SDV feature data 377 that indicates the various controllable features of the selected SDV. Based on the SDV feature data 377, the processor 340, in executing the rider application 332, can generate a customized SDV configuration interface 344 that enables the user to control the various features of the specified AV selected to transport the user to the destination. Such SDV feature data 377 can be stored in the vehicle profile of the selected SDV on the backend transport facilitation system 390.

Accordingly, once the user enters the SDV, or when the SDV is within a network-accessible distance, the mobile computing device 300 can establish a secure local connection 399 with the SDV control system 395 of the selected SDV. The user can utilize the SDV configuration interface 344 to configure air temperature, high level seating preferences (e.g., relaxed versus upright), seat temperature, radio station settings, display settings (e.g., a particular program or content setup and/or a home page), interior lighting, a travel mode (e.g., increasing ride comfort versus minimizing travel time), and the like.

As described herein, the SDV configuration interface 344 can further execute control modes based on the user's physical impairment, such as a speech recognition control mode for visual impaired users, or a visual control mode for hearing impaired users. Thus, as described herein in connection with FIG. 2, voice inputs 372 provided through a microphone 370 of the computing device 300, touch inputs provided on the display screen 320, and/or visual inputs via a camera of the mobile computing device 300, can cause the processor 340 to translate such inputs into control commands 374 to adjust the various components of the SDV. The control commands 374 may then be transmitted to the SDV control system 395 via the secure local connection 369 for execution on the SDV's controllable components accordingly.

Furthermore, the mobile computing device 300 can include an audio output device, such as one or more speakers 375. In providing assistance to a physically impaired user, the processor 340 can provide audio outputs 371 to the user in order to assist the user in entering the vehicle, exiting the vehicle, or providing voice feedback from the SDV control system 395.

METHODOLOGY

Figure 4A:
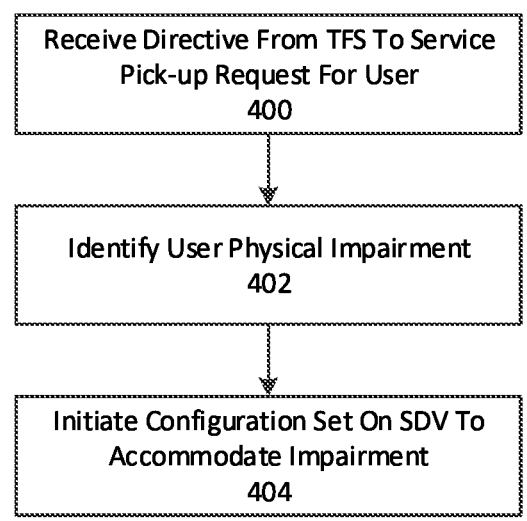
FIGS. 4A and 4B are flow charts describing example methods of accommodating riders having impairments on a transport vehicle, according to examples described herein.
Figure 4B:
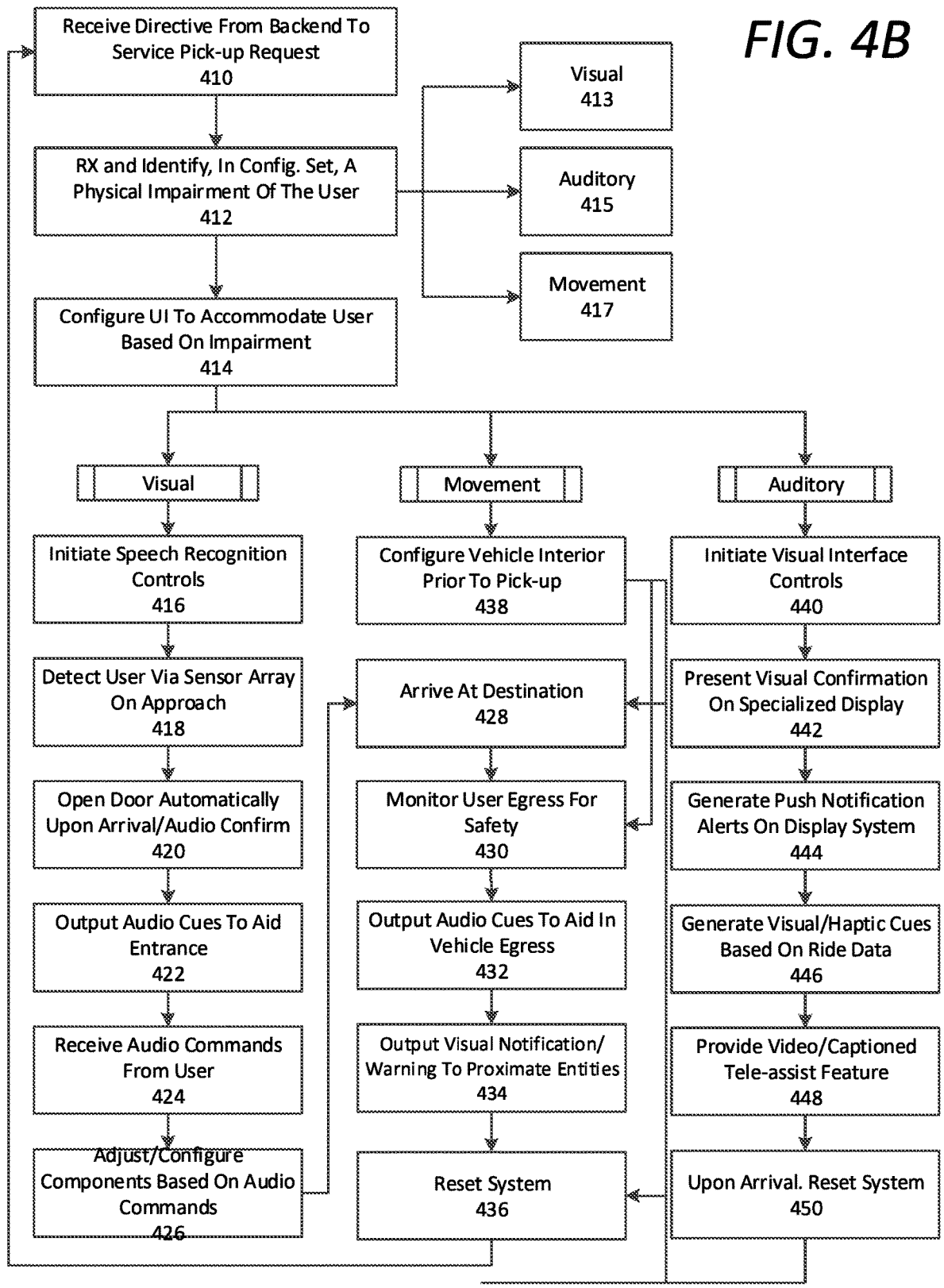

FIGS. 4A and 4B are flow charts describing example methods of accommodating riders having impairments on a transport vehicle, according to examples described herein. In the below description of FIGS. 4A and 4B, reference may be made to like reference characters representing various features shown and described with respect to FIGS. 1-3. Furthermore, the methods and processes described with respect to FIGS. 4A and 4B may be performed by an example autonomous vehicle (AV) or self-driving vehicle (SDV) as shown and described with respect to FIG. 2. Referring to FIG. 4A, the SDV 200 can receive a directive from a backend transport facilitation system 290 to service a pick-up request 197 for a requesting user (400). In on example, the directive can be a transport invitation 213 inviting the SDV 200 to service the request. The SDV 200 can utilize information such as power level, service scheduling, and the like, to determine whether or not to accept the invitation.

According to examples described herein, the SDV 200 can be provided with the physical impairment of the user. The physical impairment can be included in the directive (e.g., the transport invitation 213), or via an SDV configuration set 218 after the SDV 200 accepts the directive. Thus, the SDV 200 can identify the physical impairment of the upcoming user (402). Based on the physical impairment, the SDV 200 can execute or initiate a configuration set 218 to accommodate the user's impairment (404). In one example, the configuration set 218 can be generated to accommodate a visual impairment. In variations, the configuration set 218 can be generated to accommodate an auditory impairment. In still further variations, the configuration set 218 can be generated to accommodate a user's movement impairment. Detailed description of the execution of such configuration sets 218 is provided below in connection with FIG. 4B.

Referring to FIG. 4B, the SDV 200 can receive a directive from the backend transport facilitation system 290 to service a pick-up request 197, as described herein (410). In some examples, upon accepting the directive, the SDV 200 can receive a configuration set 218 from the transport facilitation system 290, and identify, in the configuration set 218 a physical impairment of the requesting user (412). In one example, the SDV 200 can configure a user control interface to accommodate the user based on the physical impairment (414). Accordingly, the configuration of the control interface can be based on a visual impairment (413), an auditory or hearing impairment (415), and/or movement impairment (417). In certain implementations, each specific impairment can cause the SDV 200 to execute a separate mode for the control system, such as a speech recognition control mode or a visual control mode, as described herein.

In various examples, a visual impairment indicated in the directive and/or SDV configuration set 218 can trigger the SDV 200 to initiate speech recognition controls on the control interface (i.e., user interface logic 227 described with respect to FIG. 2) (416). In some aspects, the SDV 200 can initiate a detection system, such as one or more external cameras on a sensor array, to detect the user on approach to the pick-up location (418). If the user is detected at a location that is different from the inputted or default pick-up location, the SDV 200 can override the pick-up location and autonomously drive to the curbside directly proximate to the user. The SDV 200 may then autonomously open an automatic door (e.g., a rear curbside door), and provide an audio confirmation or greeting to the user (420). In one example, the SDV 200 can greet the user by name based on information received from the transport facilitation system 290.

In some examples, the SDV 200 can monitor the user in entering the SDV 200 can provide audio cues or assistance if needed (422). Since the speech recognition controls can be automatically initiated, the user can provide immediate voice input, which can be detected by an interior microphone of the SDV 200. Thus, the SDV 200 can receive audio commands to adjust or control the various components of the SDV 200, as described herein (424). Based on the audio commands, the SDV 200 can set sub-modes corresponding to specified components (e.g., a seat adjustment sub-mode or a network service sub-mode), and adjust and/or configure the component(s) accordingly (426) (e.g., make a call or access entertainment programs).

Meanwhile the SDV 200 can drive the user to an inputted destination. Furthermore, upon arriving at the destination (428), the SDV 200 can monitor a situational environment for safety, and open the curbside door automatically when it is safe (430). In some examples, the SDV 200 can output audio cues or assistance to aid the user in safely exiting the SDV 200 (432). For example, the SDV 200 can output audio to warn the user of an oncoming bicycle or that pedestrians are nearby. Additionally or alternatively, the SDV 200 can further output a visual notification or warning to proximate entities to be aware of the user, such as externally viewable display notifications, lights, symbols, and the like (434). Once the user exits the SDV 200, the SDV 200 can reset the control interface system (436), and receive a new directive or transport invitation 213 from the transport facilitation system 290 accordingly (410).

For movement impaired users, upon receiving the SDV configuration set (412), the SDV 200 can preconfigure its passenger interior prior to arriving at the pick-up location (438). Furthermore, according to examples described herein, the SDV 200 can establish a secure local connection 268 with the mobile computing device 275 of the user, and which can enable the user to provide control inputs from mobile computing device 275 directly to control the configurable components of the SDV 200. Upon arrival at the destination (428), the SDV 200 can facilitate and monitor user egress for safety (430), and reset the control interface system (436). Thereafter, the SDV 200 can receive another directive or transport invitation 213 from the transport facilitation system 290 (410).

For hearing impaired users, the SDV 200 can initiate visual interface controls that can automatically provide text captions for entertainment, video calls or conferencing, or other displayed content, and/or recognize visual inputs, such as sign language provided by the user (440). Upon arriving at the pick-up location, the SDV 200 can provide a visual confirmation on a specialized, externally viewable display, such as a head-up display viewable from a curbside and/or forward direction of the SDV 200 (442). In certain implementations, the visual confirmation can include the user's name. During the ride, the SDV 200 can generate push notifications on the display, where such notifications can be generated in place of normal speech notifications (444). For example, the push notifications can be generated to overlay video or network content displayed on a display screen, and can indicate ride data such as ETA updates, imminent arrival, route corrections or modifications, available networks, and the like (446).

In one example, the SDV 200 can provide a video and captioned tele-assist feature that enables the user to contact a central system (e.g., the transport facilitation system 290 or emergency resource) in case of an emergency (448). Furthermore, as described herein, the SDV 200 can monitor the user for safe egress upon arrival at the destination, provide visual cues to assist the user if necessary, and reset the control interface system thereafter (450). According to examples described herein, the SDV 200 may then receive a new directive or transport invitation 213 from the transport facilitation system 290 to service a new pick-up request 197 (410).

Figure 5:
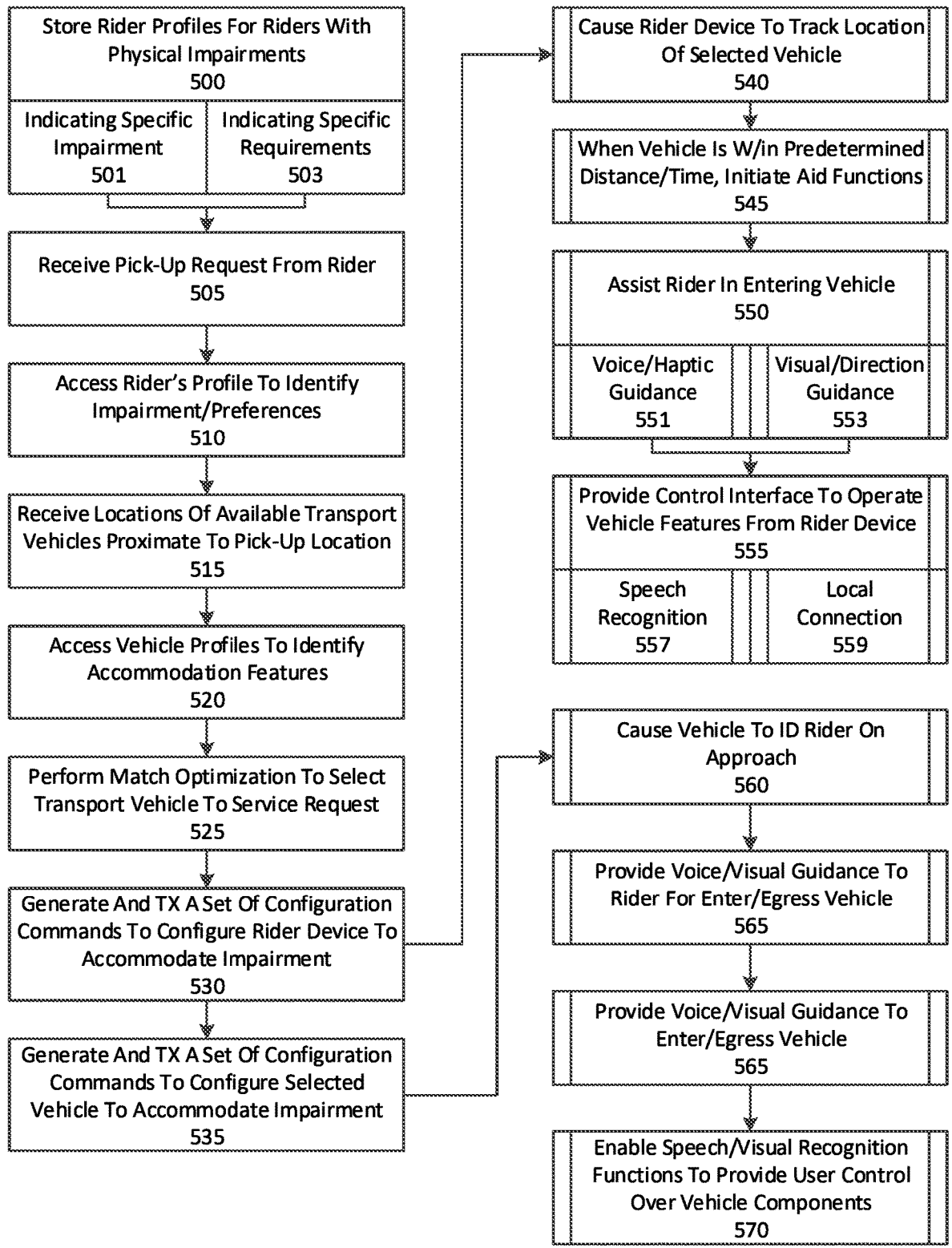
FIG. 5 is flow chart describing an example method of facilitating transportation for riders with impairments, according to examples described herein.

FIG. 5 is flow chart describing an example method of facilitating transportation for riders with impairments, according to examples described herein. In the below description of FIG. 5, reference may be made to like reference characters representing like features shown and described in connection with FIGS. 1-3. Furthermore, the method described with respect to FIG. 5 may be performed by a transport facilitation system 100 as shown and described in connection with FIG. 1. Referring to FIG. 5, the transport facilitation system 100 can compile and store rider profiles 132 for riders that have physical impairments, such as visual, auditory, or movement impairments (500). Accordingly, each of the rider profiles 132 can indicate a specific impairment, or multiple physical impairments (501). Additionally or alternatively, the rider profiles 132 can indicate specific requirements for the user (e.g., accommodation features or dimensional requirements) (503).

As described herein, the transport facilitation system 100 can receive pick-up requests 197 from users/riders throughout a given region, and match those riders with transport vehicles (e.g., available human drivers or SDVs operating throughout the given region). Accordingly, the transport facilitation system 100 can receive a pick-up request from a particular rider (505). In many aspects, the pick-up request 197 can include a unique identifier that enables a selection engine 135 of the transport facilitation system 100 to access the rider's profile 132 to identify the rider's physical impairment and/or preferences (510). Furthermore, the pick-up request can include a pick-up location, or the transport facilitation system 100 can receive location information from the user device 195 of the rider. Based on the location, the transport facilitation system 100 can receive location information from available transport vehicles proximate to the pick-up location (515).

Utilizing the requirement and/or preference information in the rider profile data 131, the transport facilitation system 100 can access vehicle profiles 134 of the proximate vehicles to identify each proximate vehicle's accommodation features (520). Utilizing the vehicle locations 192, the requirement/preference information in the rider profile data 131, and the accommodation features of each of the proximate vehicles indicated in the vehicle profile 134, the transport facilitation system 100 can perform a match optimization to select an optimal transport vehicle to service the pickup request 197 (525). In some examples, the match optimization can include a scoring or ranking operation that scores and ranks each of the proximate vehicles based on the vehicle's accommodation features in light of the requesting user's physical impairment and/or requirements, and the vehicle's distance or time from the pick-up location. In one aspect, a minimum score may be required in order for the transport facilitation system 100 to make a selection. In such an aspect, if the proximate vehicles do not meet this minimum threshold, the transport facilitation system 100 can expand the search area for additional vehicles until one is identified that satisfies the minimum threshold score.

According to some examples, the transport facilitation system 100 selects a most optimal vehicle 109 can generate an transmit a set of configuration commands 144 to configure the user's mobile computing device 100 based on the accommodation features of the SDV 200 (530). The configuration commands 144 can cause the designated application 185 on the user's device 195 to track the SDV 109 as it travels to the pick-up location (540). Furthermore, the configuration commands 144 can further cause the user device 195 to initiate one or more assistance functions, such as voice assistance for a visually impaired user, or notification and text captioning functions for a hearing impaired user (525). Thus, based on the configuration set 144, the user device 195 can assist the rider in entering the SDV 109 (550), such as providing voice or haptic guidance (551), or by providing visual or directional guidance (553). In some examples, the set of configurations 144 can further cause the user device 195 to establish a secure local connection with the SDV 109 (559), and generate a control interface on the user device 195 to enable user control over the various controllable features of the selected SDV 109 based on the specific feature of the SDV 109 identified in the AV's 109 vehicle profile 134 (555). In one example, the set of configurations 144 can cause the user's device 195 to execute a speech recognition control interface (e.g., for visually impaired riders) to enable the user to control the various components of the SDV 200 using speech commands, as described herein (557).

According to many examples, upon selection of the most optimal SDV 109 to service the pick-up request 197, the transport facilitation system 100 can generate and transmit a set of configuration commands 146 to the SDV 109 to configure the SDV 109 in order to accommodate the user's physical impairment (535). Accordingly, the SDV configuration set 146 can cause the selected SDV 109 to identify the rider as the SDV 109 approaches the rider using a monitoring system (560), provide voice and/or visual guidance to assist the user in entering and exiting the SDV 109 (565), and enable speech and/or visual recognition functions on the SDV 109 to enable the user to control the various vehicle components of the SDV 109 (570), as described above with respect to FIGS. 1-3 and FIGS. 4A and 4B.

Figure 6:
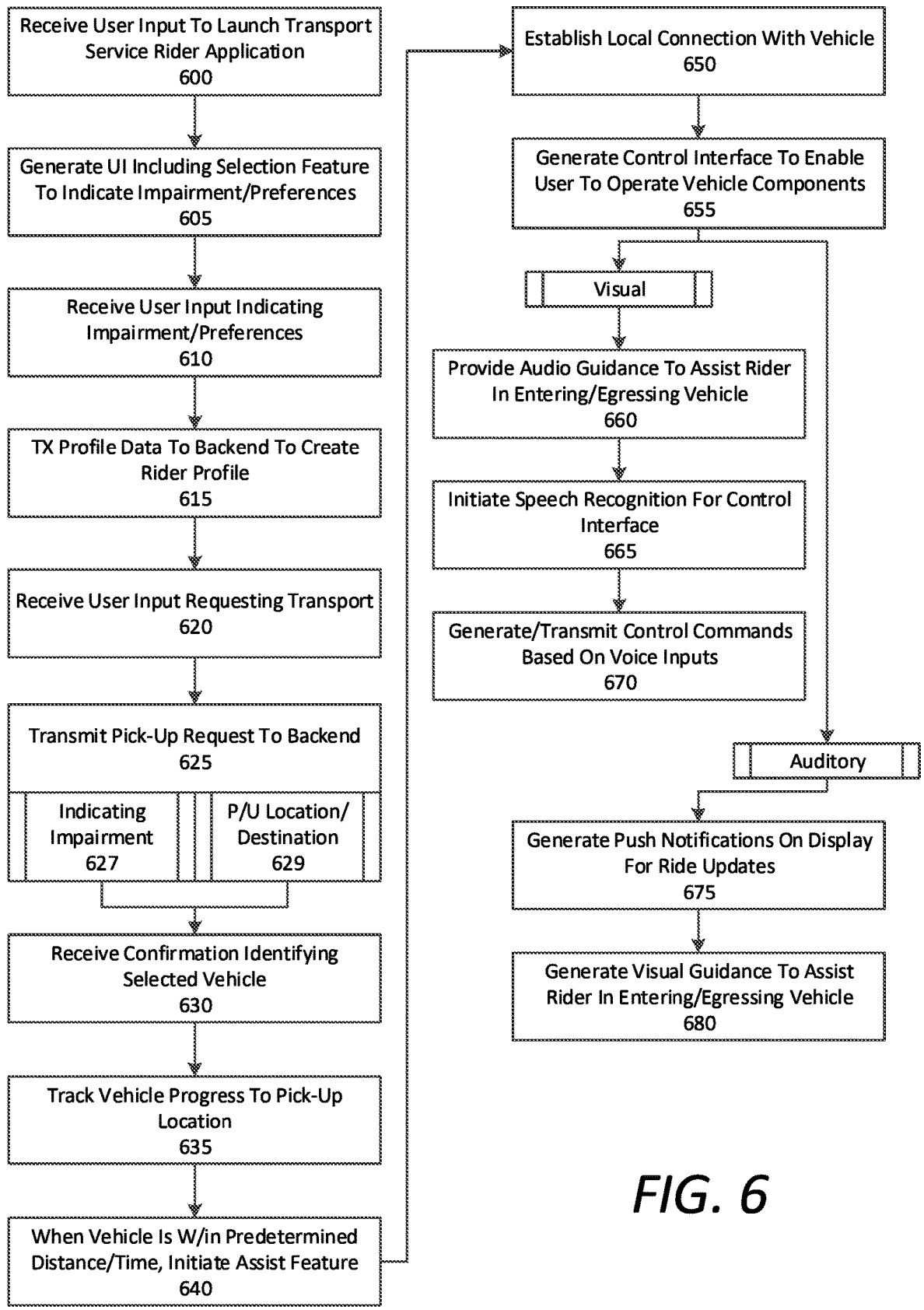
FIG. 6 is a flow chart describing an example method of aiding a physically impaired rider on a computing device in connection with a transportation service, according to examples described herein.

FIG. 6 is a flow chart describing an example method of aiding a physically impaired rider on a computing device in connection with a transportation service, according to examples described herein. In the below discussion of FIG. 6, reference may be made to like reference characters representing like features shown and described with respect to FIGS. 1-3. Furthermore, the method described in connection with FIG. 6 may be performed by an example mobile computing device 300 as shown and described in connection with FIG. 3. Referring to FIG. 6, the mobile computing device 300 can receive a user input to launch a rider app 332 corresponding to a transportation arrangement service (600). In one or more examples, the mobile computing device 300 can generate a user interface 342 on the display screen 320, where the user interface 342 can include a selection feature to enable the user to indicate a physical impairment, accommodation requirements, or preferences (605). The mobile computing device 300 can receive user inputs 318 indicating the impairment, requirements, and/or preferences of the user (610). Such inputs can be transmitted to the backend transport facilitation system 390 over a network 380 in order to create a rider profile comprising rider profile data indicating the physical impairment (e.g., visual, auditory, or movement) for the user (615).

In many examples, the mobile computing device 300 can receive user inputs 318 requesting transport from a pickup location to a destination (620). The mobile computing device 300 can then generate and transmit the pick-up request 367 to the transport facilitation system 390 over the network 380 (625). In one example, the pick-up request 367 can indicate the physical impairment of the user, for example, when the user is a new user and has not created a profile (627). Furthermore, according to examples described herein, the pick-up request 367 can further include a pick-up location and a destination for the ride (629).

According to some examples, the mobile computing device 300 can receive a confirmation 369 from the transport facilitation system 390 that indicates the specified vehicle en route to service the pick-up request 367 (630). While the vehicle is en route to the pick-up location, the mobile computing device 300 can track the vehicle progress to the pick-up location (635). Furthermore, when the vehicle is within a predetermined distance or time to the pick-up location, the mobile computing device 300 can initiate an assistance feature on the rider application 332, based on the user's physical impairment, that can assist the user over a duration of the trip (640).

When the matched vehicle is an SDV, the mobile computing device 300 can establish a local connection with the control system 395 of the SDV when the SDV is within a connection distance, or when the user is otherwise authenticated by the SDV (650). In some aspects, the confirmation 369 can further include information corresponding to the specific accommodation features of the vehicle (e.g., a matched SDV), which can be utilized by the mobile computing device 300 to generate a customized user interface to enable the user to control and operate the various components of the SDV, as described herein (655). Furthermore, the control interface can further be based on the user's impairment. For example, the control interface for a visual impaired user can provide audio guidance to assist the user in entering and exiting the vehicle, such as notifying the user when the vehicle is approaching the pick-up location and/or destination (660).

Furthermore, the control interface can further execute speech recognition to enable the user to provide voice inputs 372 into a microphone 370 of the mobile computing device 300 in order to generate control commands 374 to control the components of the SDV (665). Accordingly, the processor 340, executing the designated rider application 332, can translate the voice inputs 372 into control commands 374, and transmit the control commands 374 to the SDV control system 395 to cause the SDV to adjust or configure the corresponding components (670).

For hearing impaired users, the mobile computing device 300 can generate push notifications on the display screen 320 for ride updates (675), provide haptic feedback, and/or generate visual guidance to assist the user in locating a match vehicle (e.g., via a compass feature), or to provide haptic and visual feedback in entering or exiting the vehicle (680).

HARDWARE DIAGRAMS

Figure 7:
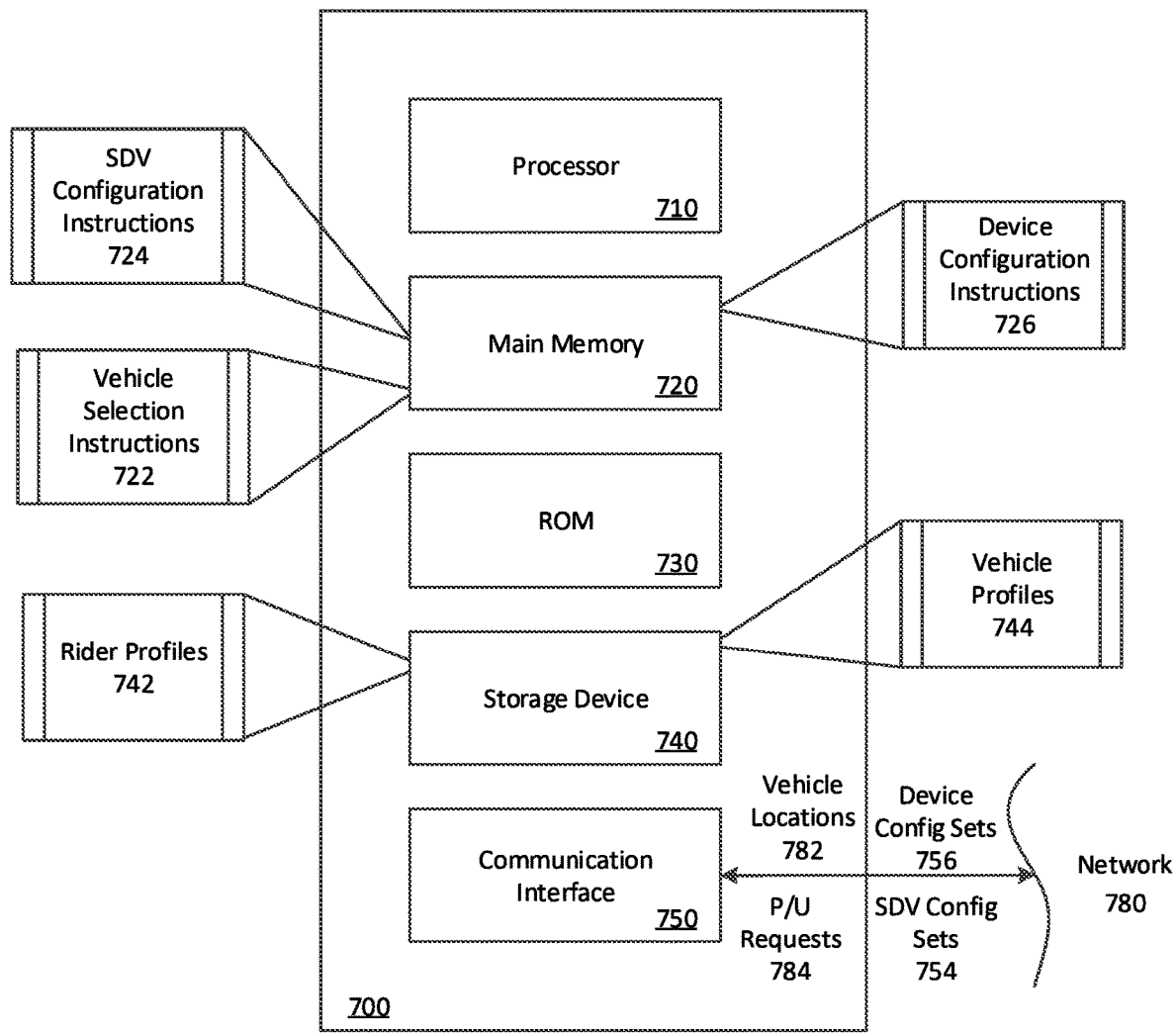
FIG. 7 is a block diagram illustrating a computer system upon which examples described herein may be implemented.

FIG. 7 is a block diagram that illustrates a computer system upon which examples described herein may be implemented. A computer system 700 can be implemented on, for example, a server or combination of servers. For example, the computer system 700 may be implemented as part of a network service for providing transportation services. In the context of FIG. 1, the transport facilitation system 100 may be implemented using a computer system 700 such as described by FIG. 7. The transport facilitation system 100 may also be implemented using a combination of multiple computer systems as described in connection with FIG. 7.

In one implementation, the computer system 700 includes processing resources 710, a main memory 720, a read-only memory (ROM) 730, a storage device 740, and a communication interface 750. The computer system 700 includes at least one processor 710 for processing information stored in the main memory 720, such as provided by a random access memory (RAM) or other dynamic storage device, for storing information and instructions which are executable by the processor 710. The main memory 720 also may be used for storing temporary variables or other intermediate information during execution of instructions to be executed by the processor 710. The computer system 700 may also include the ROM 730 or other static storage device for storing static information and instructions for the processor 710. A storage device 740, such as a magnetic disk or optical disk, is provided for storing information and instructions.

The communication interface 750 enables the computer system 700 to communicate with one or more networks 780 (e.g., cellular network) through use of the network link (wireless or wired). Using the network link, the computer system 700 can communicate with one or more computing devices, one or more servers, driver devices, and/or one or more SDVs. In accordance with examples, the computer system 700 receives pick-up requests 784 from mobile computing devices of individual users. The executable instructions stored in the memory 730 can include vehicle selection instructions 722, which the processor 710 executes to access rider profiles 742 and vehicle profiles 744 in the storage device 740, in order to perform a matching optimization operation to identify a most optimal vehicle to service a pick-up request 784. In selecting the most optimal vehicle, the processor 710 can receive vehicle locations 782 corresponding to vehicle proximate to the pick-up location, determine each of the vehicles' accommodation features from their vehicle profiles 744, and rank vehicles based on most accommodating to least accommodating in light of the ETA to the pick-up location.

The main memory 720 can further store SDV configuration instructions 724 to generate SDV configuration sets 754 to accommodate the physical impairments of a rider, as described above. The executable instructions stored in the memory 720 can also include device configuration instructions 726, which causes the processor 710 to generate a configuration set 756 for the user's mobile computing device in order to cause the computing device to generate a control interface to control the various components of a selected SDV. By way of example, the instructions and data stored in the memory 720 can be executed by the processor 710 to implement an example transport facilitation system 100 of FIG. 1. In performing the operations, the processor 710 can receive pick-up requests 784 and vehicle location data 782, select an SDV or transport vehicle to service the requests 784, generate and transmit invitations to AVs and transport vehicles to service the pick-up requests 784, and generate SDV configuration sets 754 and/or device configuration sets 754 to configure a selected SDV and/or the user's computing device based on the user's physical impairment.

The processor 710 is configured with software and/or other logic to perform one or more processes, steps and other functions described with implementations, such as described by FIGS. 1 through 6, and elsewhere in the present application.

Figure 8:
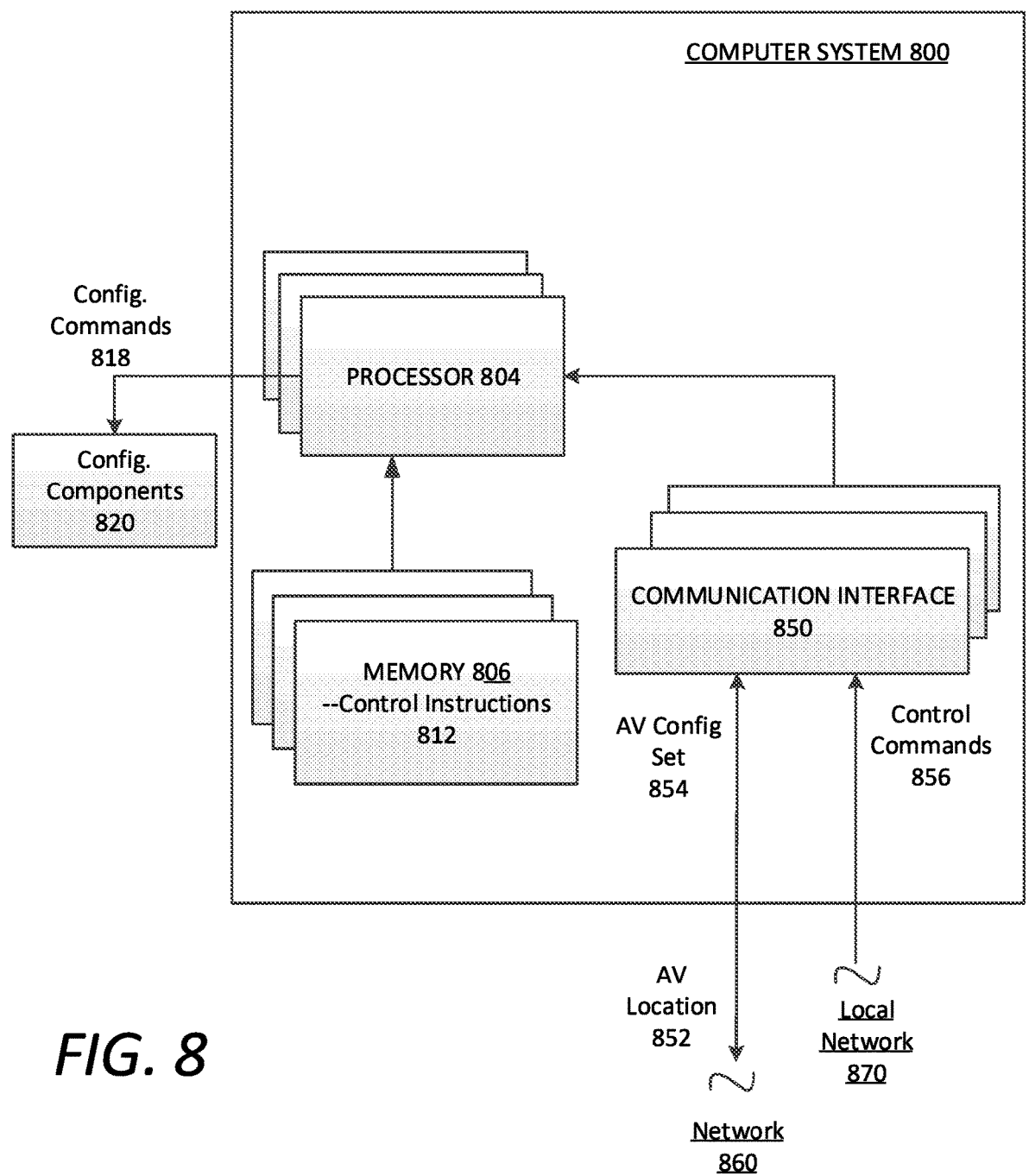
FIG. 8 is a block diagram illustrating a computing system for an AV or SDV upon which examples described herein may be implemented.

FIG. 8 is a block diagram illustrating a computer system upon which example SDV processing systems described herein may be implemented. The computer system 800 can be implemented using one or more processors 804, and one or more memory resources 806. In the context of FIG. 2, the control system 220 can implemented using one or more components of the computer system 800 shown in FIG. 8.

According to some examples, the computer system 800 may be implemented within an autonomous vehicle or self-driving vehicle with software and hardware resources such as described with examples of FIG. 2. In an example shown, the computer system 800 can be distributed spatially into various regions of the SDV, with various aspects integrated with other components of the SDV itself. For example, the processors 804 and/or memory resources 806 can be provided in the trunk of the SDV. The various processing resources 804 of the computer system 800 can also execute control instructions 812 using microprocessors or integrated circuits. In some examples, the control instructions 812 can be executed by the processing resources 804 or using field-programmable gate arrays (FPGAs).

In an example of FIG. 8, the computer system 800 can include a communication interface 850 can enable communications over one or more networks 860 with a backend transport facilitation system, such as those examples described with respect to FIG. 1. In one implementation, the communication interface 850 can also provide a data bus or other local links to electro-mechanical interfaces of the vehicle, such as wireless or wired links to and from the SDV control system 220, and can provide a network link to a transport facilitation system over one or more networks 860. Further still, the communication interface 850 can include a local wireless or wired communication link with a user's mobile computing device, for example, once the user enters the SDV.

The memory resources 806 can include, for example, main memory, a read-only memory (ROM), storage device, and cache resources. The main memory of memory resources 806 can include random access memory (RAM) or other dynamic storage device, for storing information and instructions which are executable by the processors 804. The processors 804 can execute instructions for processing information stored with the main memory of the memory resources 806. The main memory 806 can also store temporary variables or other intermediate information which can be used during execution of instructions by one or more of the processors 804. The memory resources 806 can also include ROM or other static storage device for storing static information and instructions for one or more of the processors 804. The memory resources 806 can also include other forms of memory devices and components, such as a magnetic disk or optical disk, for purpose of storing information and instructions for use by one or more of the processors 804.

According to some examples, the memory 806 may store a plurality of software instructions including, for example, control instructions 812. The control instructions 812 may be executed by one or more of the processors 804 in order to implement functionality such as described with respect to FIGS. 2, 4A, and 4B.

In certain examples, the computer system 800 can receive SDV configuration sets 864 via the communication interface 850 and network 860 from a transport facilitation system. In executing the control instructions 812, the processing resources 804 can generate and execute configuration commands 818 to adjust and configure the various configurable components 820 of the SDV. Upon establishing a local connection with a user's mobile computing device, the communication interface 850 can receive control commands 856 from the user's mobile computing device to operate the various controllable components 820 of the SDV. According to examples, the processor 804 can translate the control commands 856 into configuration commands 818 that can be executed on the controllable components 820 based on user inputs on a connect mobile computing device.

While examples of FIGS. 3, 7, and 8 provide for computing systems for implementing aspects described, some or all of the functionality described with respect to one computing system of FIGS. 3, 7, and 8 may be performed by one or more other computing systems described with respect to FIGS. 3, 7, and 8.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A transport facilitation system comprising:
    at least one processor; and
    a memory storing instructions that, when executed, cause the transport facilitation system to perform operations comprising:
        accessing transportation service request data describing a request for a transportation service from a requesting user;
        accessing user profile data indicating a physical impairment of the requesting user, the physical impairment comprising a hearing impairment; and
        sending, over at least one network, a transportation service instruction to a self-driving vehicle (SDV), the transportation service instruction describing the request for the transportation service, the transportation service instruction comprising the user profile data, and the transportation service instruction causing the SDV to perform operations comprising:
            operating at least one of an acceleration system, a braking system, or a steering system of the SDV to execute the transportation service;
            monitoring the requesting user, using sensor data generated by a sensor system of the SDV; and
            based on the monitoring, outputting visual assistance to aid the requesting user in at least one of entering the SDV or exiting the SDV.

2. The transport facilitation system of claim 1, the accessing of the transportation service request data comprising receiving the transportation service request data from a mobile computing device of the requesting user.

3. The transport facilitation system of claim 2, the user profile data indicating that the requesting user is in need of audio assistance for the transportation service, the memory further comprising instructions that, when executed, cause the transport facilitation system to perform further operations comprising:
    sending, to the mobile computing device, an indication of the SDV;
    instructing the mobile computing device to track a location of the SDV while the SDV is enroute to a pick-up location; and
    instructing the mobile computing device to initiate audio assistance when the SDV is within a predetermined distance or a predetermined time from the pick-up location.

4. The transport facilitation system of claim 2, the transportation service instruction further causing the SDV to perform operations comprising initiating a speech-recognition control interface to enable the requesting user to control a plurality of configurable components of the SDV by providing voice input.

5. The transport facilitation system of claim 4, the plurality of configurable components of the SDV comprising at least one of a seat adjustment component, an audio system, a window of the SDV, or a climate control system.

6. The transport facilitation system of claim 2, the transportation service instruction further causing the SDV to perform operations comprising:
    using the sensor system of the SDV, detecting the requesting user as the SDI' approaches a pick-up location; and
    outputting the visual assistance to aid the requesting user in entering the SDV based on the detecting of the requesting user.

7. The transport facilitation system of claim 1, the transportation service instruction further causing the SDV to perform operations comprising:
    using the sensor system of the SDV, detecting the requesting user as the SDV approaches a pick-up location; and
    automatically opening a door of the SDV based on the detecting of the requesting user.

8. The transport facilitation system of claim 1, the user profile data comprising a name of the requesting user, the transportation service instruction further causing the SDV to perform operations comprising incorporating the name of the requesting user into the visual assistance.

9. A method for facilitating transportation services, the method comprising:
    accessing, by a transport facilitation system, transportation service request data describing a request for a transportation service from a requesting user, the transport facilitation system comprising at least one processor and a memory;

accessing, by the transport facilitation system, user profile data indicating a physical impairment of the requesting user, the physical impairment comprising a hearing impairment; and sending, over at least one network, a transportation service instruction to a self-driving vehicle (SDV), the transportation service instruction describing the request for the transportation service, the transportation service instruction comprising the user profile data, and the transportation service instruction causing the SDV to perform operations comprising:

operating at least one of an acceleration system, a braking system, or a steering system of the SDV to execute the transportation service;

monitoring the requesting user, using sensor data generated by a sensor system of the SDV; and based on the monitoring, outputting visual assistance to aid the requesting user in at least one of entering the SDV or exiting the SDV.

10. The method of claim 9, the accessing of the transportation service request data comprising receiving the transportation service request data from a mobile computing device of the requesting user.

11. The method of claim 10, the user profile data indicating that the requesting user is in need of audio assistance for the transportation service, the method further comprising:

sending, to the mobile computing device, an indication of the SDV;

instructing the mobile computing device to track a location of the SDV while the SDV is enroute to a pick-up location; and instructing the mobile computing device to initiate audio assistance when the SDV is within a predetermined distance or a predetermined time from the pick-up location.

12. The method of claim 9, the transportation service instruction further causing the SDV to perform operations comprising initiating a speech-recognition control interface to enable the requesting user to control a plurality of configurable components of the SDV by providing voice input.

13. The method of claim 12, the plurality of configurable components of the SDV comprising at least one of a seat adjustment component, an audio system; a window of the SDV, or a climate control system.

14. The method of claim 9, the transportation service instruction further causing the SDV to perform operations comprising:

using the sensor system of the SDV, detecting the requesting user as the SDV approaches a pick-up location; and outputting the visual assistance to aid the requesting user in entering the SDV based on the detecting of the requesting user.

15. The method of claim 9, the transportation service instruction further causing the SDV to perform operations comprising:

using the sensor system of the SDV, detecting the requesting user as the SDV approaches a pick-up location; and automatically opening a door of the SDV based on the detecting of the requesting user.

16. The method of claim 9, the user profile data comprising a name of the requesting user, the transportation service instruction further causing the SDV to perform operations comprising incorporating the name of the requesting user into the visual assistance.

17. A non-transitory computer-readable medium comprising instructions thereon that, when executed by at least one processor, causes the at least one processor to perform operations comprising:

accessing transportation service request data describing a request for a transportation service from a requesting user;

accessing user profile data indicating a physical impairment of the requesting user, the physical impairment comprising a hearing impairment; and sending, over at least one network, a transportation service instruction to a self-driving vehicle (SDV), the transportation service instruction describing the request for the transportation service, the transportation service instruction comprising the user profile data, and the transportation service instruction causing the SDV to perform operations comprising:

operating at least one of an acceleration system, a braking system, or a steering system of the SDV to execute the transportation service;

monitoring the requesting user, using sensor data generated by a sensor system of the SDV; and based on the monitoring, outputting visual assistance to aid the requesting user in at least one of entering the SUV or exiting the SDV.

18. The medium of claim 17, the accessing of the transportation service request data comprising receiving the transportation service request data from a mobile computing device of the requesting user.

19. The medium of claim 18, the user profile data indicating that the requesting user is in need of audio assistance for the transportation service, the operations further comprising:

sending, to the mobile computing device, an indication of the SDV;

instructing the mobile computing device to track a location of the SDV while the SDV is enroute to a pick-up location; and instructing the mobile computing device to initiate audio assistance when the SDV is within a predetermined distance or a predetermined time from the pick-up location.

* * * * *

UNITED STATES PATENT AND TRADEMARK OFFICE
CERTIFICATE OF CORRECTION

PATENT NO. : 11,756,429 B2
APPLICATION NO. : 17/664517
DATED : September 12, 2023
INVENTOR(S) : Emily Bartel Page 1 of 1

It is certified that error appears in the above-identified patent and that said Letters Patent is hereby corrected as shown below:

In the Claims

In Column 24, Line 34, in Claim 4, delete "claim 2," and insert --claim 1,-- therefor In Column 24, Line 44, in Claim 6, delete "claim 2," and insert --claim 1,-- therefor In Column 24, Line 48, in Claim 6, delete "SDI'" and insert --SDV-- therefor In Column 25, Line 48, in Claim 13, delete "system;" and insert --system,-- therefor In Column 26, Line 39, in Claim 17, delete "SUV" and insert --SDV-- therefor Signed and Sealed this
Twenty-seventh Day of February, 2024

Katherine Kelly Vidal
*Director of the United States Patent and Trademark Office*